US 11,809,471 B2

(12) United States Patent
Chopra et al.

(10) Patent No.: US 11,809,471 B2
(45) Date of Patent: Nov. 7, 2023

(54) METHOD AND SYSTEM FOR IMPLEMENTING A PRE-CHECK MECHANISM IN A TECHNICAL SUPPORT SESSION

(71) Applicant: EMC IP Holding Company LLC, Hopkinton, MA (US)

(72) Inventors: Shelesh Chopra, Bangalore (IN); Parminder Singh Sethi, Punjab (IN); Akanksha Goel, Faridabad (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/502,177

(22) Filed: Oct. 15, 2021

(65) Prior Publication Data

US 2023/0122945 A1    Apr. 20, 2023

(51) Int. Cl.
  *G06F 16/00* (2019.01)
  *G06F 16/332* (2019.01)
  *G06F 16/33* (2019.01)
  *H04L 41/5074* (2022.01)
  *G06F 18/22* (2023.01)

(52) U.S. Cl.
  CPC ...... *G06F 16/3329* (2019.01); *G06F 16/3326* (2019.01); *G06F 16/3344* (2019.01); *G06F 18/22* (2023.01); *H04L 41/5074* (2013.01)

(58) Field of Classification Search
  CPC ............ G06F 16/3329; G06F 16/3326; G06K 9/6215; H04L 41/5074
  USPC ........................................................ 707/723
  See application file for complete search history.

(56) References Cited

U.S. PATENT DOCUMENTS

| 7,698,131 | B2  |   | 4/2010  | Bennett |
|------------|-----|---|---------|---------|
| 10,192,179 | B1  | * | 1/2019  | Agarwal ........ G06Q 10/063114 |
| 10,410,219 | B1  | * | 9/2019  | El-Nakib .......... G06F 16/90332 |
| 10,721,142 | B1  | * | 7/2020  | Mathur ................ G06K 9/6282 |
| 11,436,642 | B1  | * | 9/2022  | Podgorny ........... G06F 16/3329 |
| 11,461,787 | B1  |   | 10/2022 | Riley |
| 11,561,849 | B1  |   | 1/2023  | Kairali et al. |

(Continued)

FOREIGN PATENT DOCUMENTS

| CA | 2568137 A1    | 2/2007 |
| CN | 105493446 A * | 4/2016 |

(Continued)

OTHER PUBLICATIONS

Mark Granger, "Service Now products and Services Explained", Aug. 12, 2022 (18 pages).

(Continued)

*Primary Examiner* — Monica M Pyo
(74) *Attorney, Agent, or Firm* — Chamberlain, Hrdlicka, White, Williams & Aughtry

(57) ABSTRACT

In general, embodiments relates to a method for managing a technical support session, comprising: obtaining technical support question from a technical support person (TSP) that is conducting the technical support session; determining that the technical support question is a duplicate of a prior technical support question; in response to the determination, obtaining a quality score for the technical support question; and displaying the quality score to the TSP in a user interface on a technical support system that the TSP is using the conduct the technical support session.

17 Claims, 16 Drawing Sheets

(56) References Cited

U.S. PATENT DOCUMENTS

| | | |
|---|---|---|
| 2001/0047270 A1 | 11/2001 | Gusick et al. |
| 2007/0276631 A1 | 11/2007 | Subramanian et al. |
| 2009/0083246 A1 | 3/2009 | Coker et al. |
| 2011/0055122 A1 | 3/2011 | Andreoli |
| 2011/0071869 A1 | 3/2011 | Obrien et al. |
| 2011/0118932 A1 | 5/2011 | Singh et al. |
| 2011/0320228 A1 | 12/2011 | Kowalski |
| 2012/0102371 A1 | 4/2012 | Tonouchi |
| 2012/0185290 A1 | 7/2012 | Mueller |
| 2013/0268260 A1 | 10/2013 | Lundberg et al. |
| 2014/0067375 A1 | 3/2014 | Wooters |
| 2014/0324276 A1 | 10/2014 | Weaks |
| 2015/0127322 A1 | 5/2015 | Clark |
| 2015/0193429 A1* | 7/2015 | Bohra ............... G06F 16/3329 704/9 |
| 2016/0027019 A1 | 1/2016 | Michaelangelo et al. |
| 2016/0055044 A1 | 2/2016 | Kawai et al. |
| 2016/0132812 A1 | 5/2016 | Beasley et al. |
| 2016/0171505 A1* | 6/2016 | Johri ............... G06Q 30/016 705/7.11 |
| 2017/0011308 A1 | 1/2017 | Sun et al. |
| 2017/0109222 A1 | 4/2017 | Singh et al. |
| 2017/0132060 A1 | 5/2017 | Nomura et al. |
| 2017/0169325 A1 | 6/2017 | Mccord et al. |
| 2017/0230312 A1 | 8/2017 | Barrett et al. |
| 2017/0270419 A1 | 9/2017 | Sánchez Charles et al. |
| 2018/0012231 A1 | 1/2018 | Sapoznik et al. |
| 2018/0095814 A1 | 4/2018 | Patil |
| 2018/0285320 A1 | 10/2018 | Yang et al. |
| 2018/0329768 A1 | 11/2018 | Bikumala et al. |
| 2019/0163594 A1 | 5/2019 | Hayden et al. |
| 2019/0228107 A1 | 7/2019 | Trim et al. |
| 2019/0228296 A1 | 7/2019 | Gefen et al. |
| 2019/0268470 A1 | 8/2019 | Amir et al. |
| 2020/0027094 A1 | 1/2020 | Consalvo et al. |
| 2020/0133755 A1 | 4/2020 | Bansal et al. |
| 2020/0240875 A1 | 7/2020 | Venkateswaran et al. |
| 2020/0311738 A1 | 10/2020 | Gupta et al. |
| 2020/0364638 A1 | 11/2020 | Molloy et al. |
| 2021/0136195 A1 | 5/2021 | Adibi et al. |
| 2021/0157985 A1 | 5/2021 | Rotkop et al. |
| 2021/0208971 A1 | 7/2021 | Srinivasan |
| 2022/0036175 A1 | 2/2022 | Krishnamurthy et al. |
| 2022/0067746 A1 | 3/2022 | Thakkar |
| 2022/0094789 A1 | 3/2022 | Lau et al. |
| 2022/0129257 A1 | 4/2022 | Touati et al. |
| 2022/0172222 A1 | 6/2022 | Chin et al. |
| 2022/0208188 A1 | 6/2022 | Yoffe et al. |
| 2022/0308943 A1 | 9/2022 | Srinivasan et al. |
| 2022/0394348 A1 | 12/2022 | Hatambeiki et al. |
| 2022/0400060 A1 | 12/2022 | Sethi et al. |
| 2023/0047346 A1 | 2/2023 | Daniel et al. |
| 2023/0053913 A1 | 2/2023 | De Souza et al. |
| 2023/0073644 A1 | 3/2023 | Thakkar et al. |
| 2023/0132116 A1 | 4/2023 | Sethi et al. |

FOREIGN PATENT DOCUMENTS

| | | |
|---|---|---|
| CN | 105493446 A | 4/2016 |
| EP | 1873699 A1 | 1/2008 |
| WO | 9858356 A2 | 12/1998 |
| WO | 2009087489 A1 | 7/2009 |
| WO | 2013151808 A1 | 10/2013 |

OTHER PUBLICATIONS

Anonymous, Cloud-Based Contact Center Market Next Big Thing / Major Giants Five9, CloudTalk, Talkdesk, Year: Jan. 20, 2021, M2 Presswire (3 pages).

Caporuscio Mauro et al., Smart-troubleshooting connected devices: Concept, challenges and opportunities, Future Generation Computer Systems, Elsevier Science Publishers. Amsterdam, NL, vol. 111. Sep. 16, 2019, pp. 681-697 (17 pages).

Dhoolia, A cognitive system for business and technical support: A case study, Year: 2017, pp. 74-85, vol. 61, No. 1, paper 7 (12 pages).

International Searching Authority, International Search Report and Written Opinion dated May 8, 2023 for corresponding PCT Application No. PCTUS2023010749 filed Jan. 13, 2023 (14 pages).

Law, Yuh Foong David, An Integrated Case-Based Reasoning Approach for Intelligent Help Desk Fault Management, National University of Singapore, Year: 1998, pp. 265-274, vol. 13, No. 4 (10 pages).

Shannon Keown, What Call Center Location is Right for Your? (& Considerations), Sep. 1, 2021 (9 pages).

Unknown, Multi-Site Contact Centers—Can they work for your business?, May 13, 2021 (3 pages).

* cited by examiner

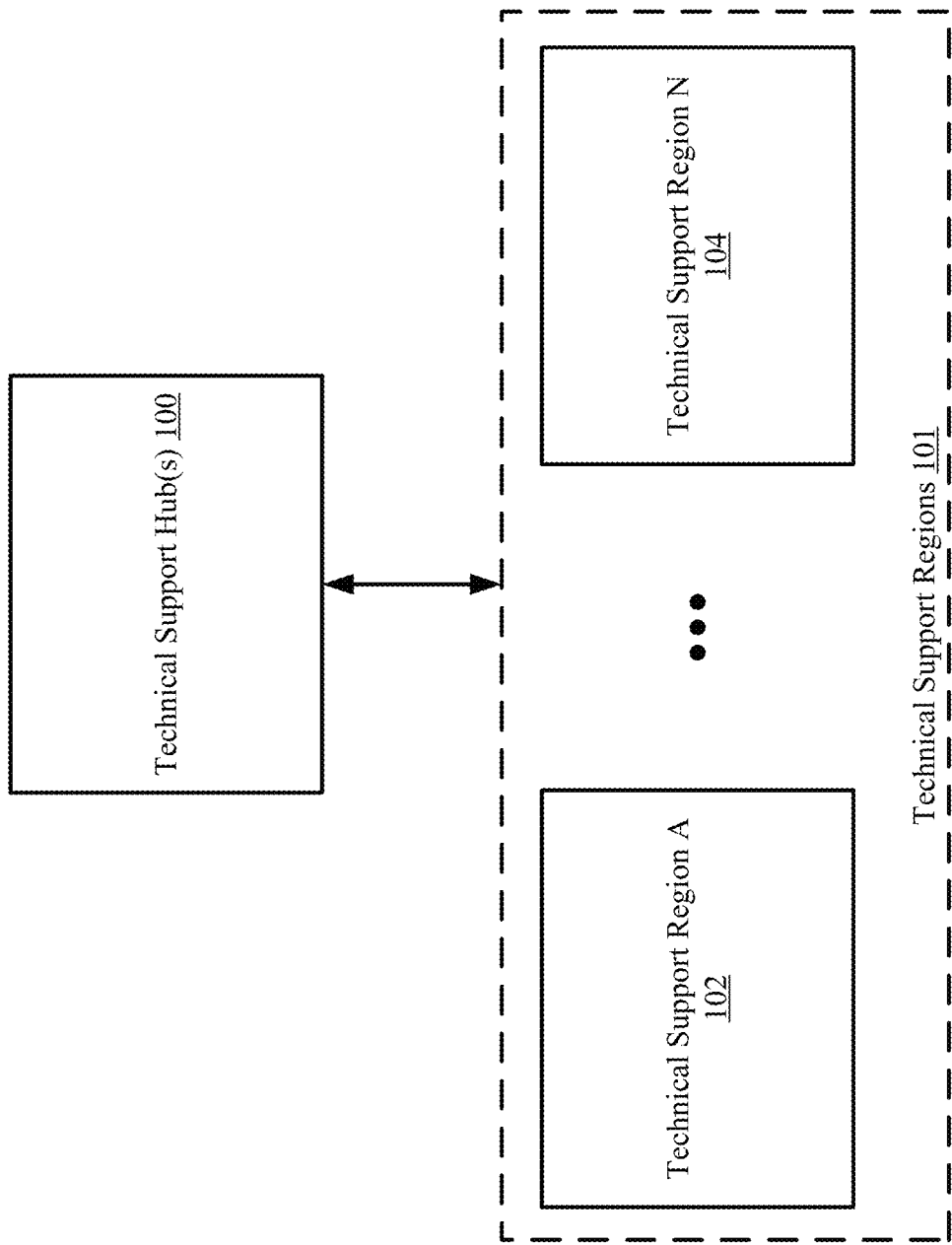
FIG. 1.1

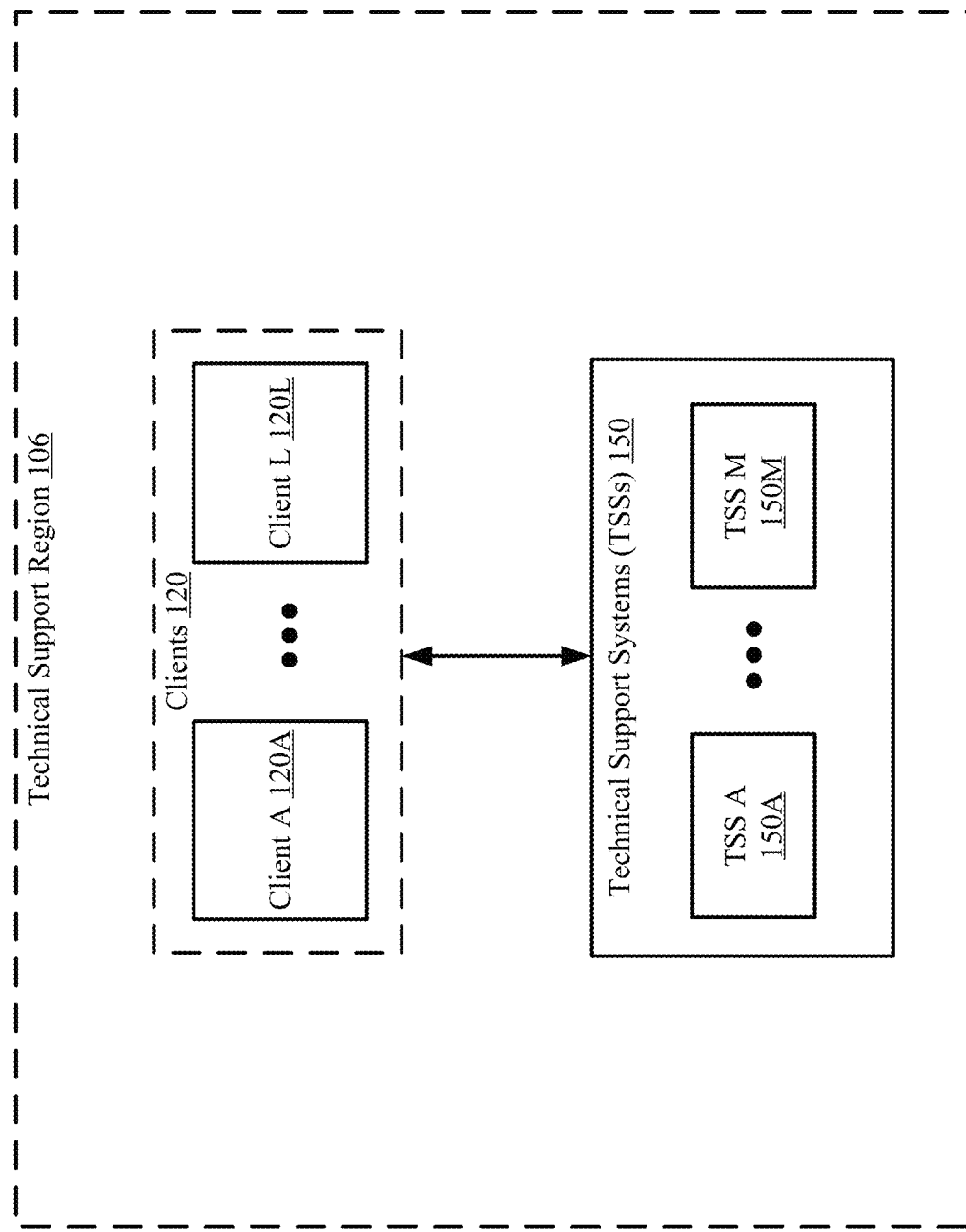
FIG. 1.2

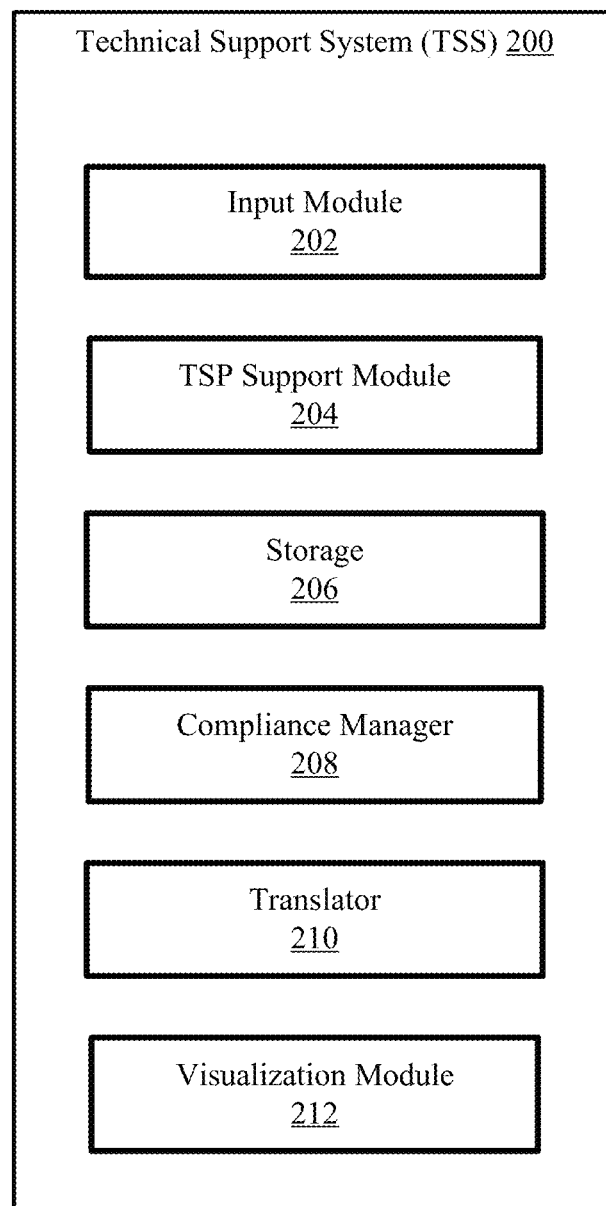
FIG. 2.1

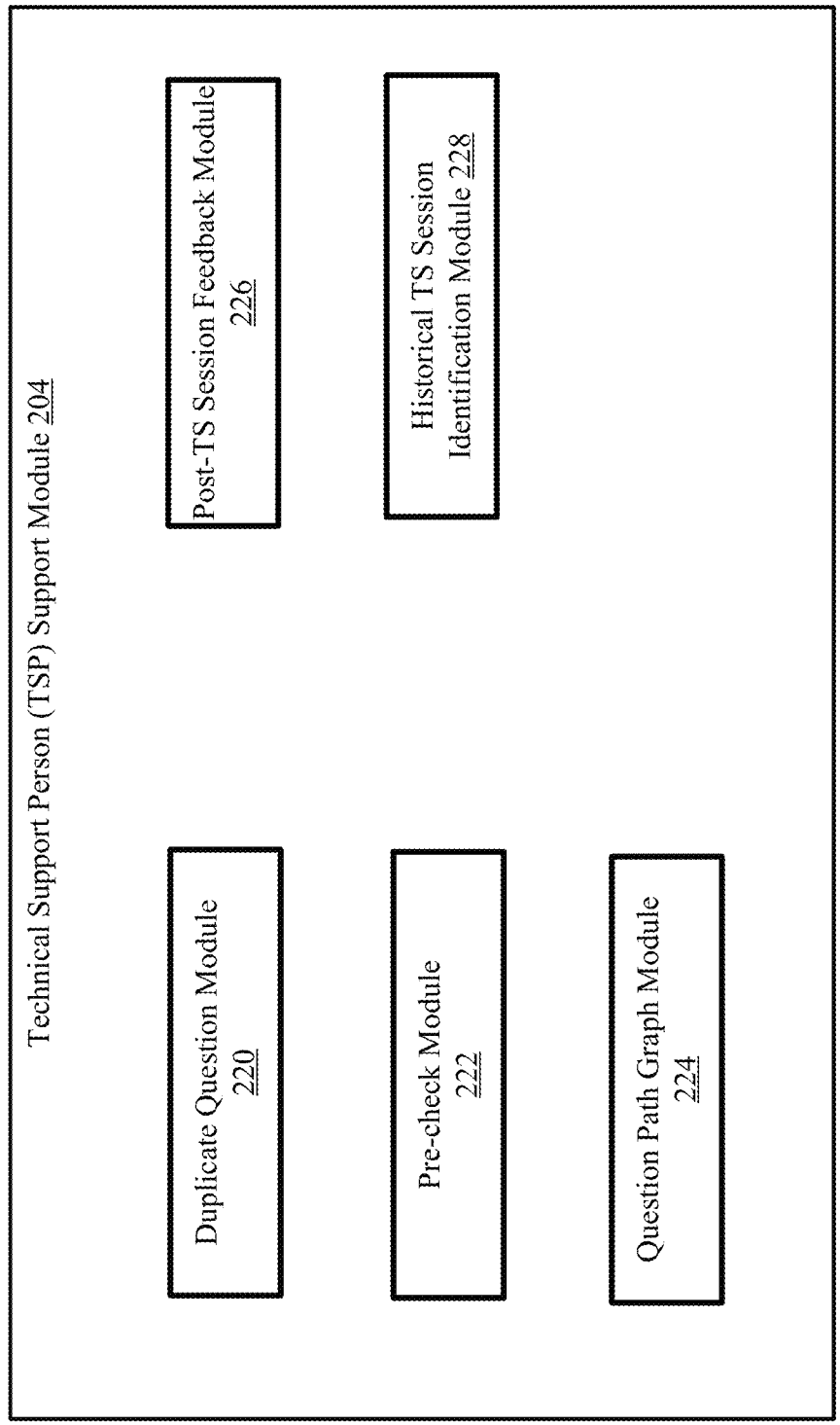
FIG. 2.2

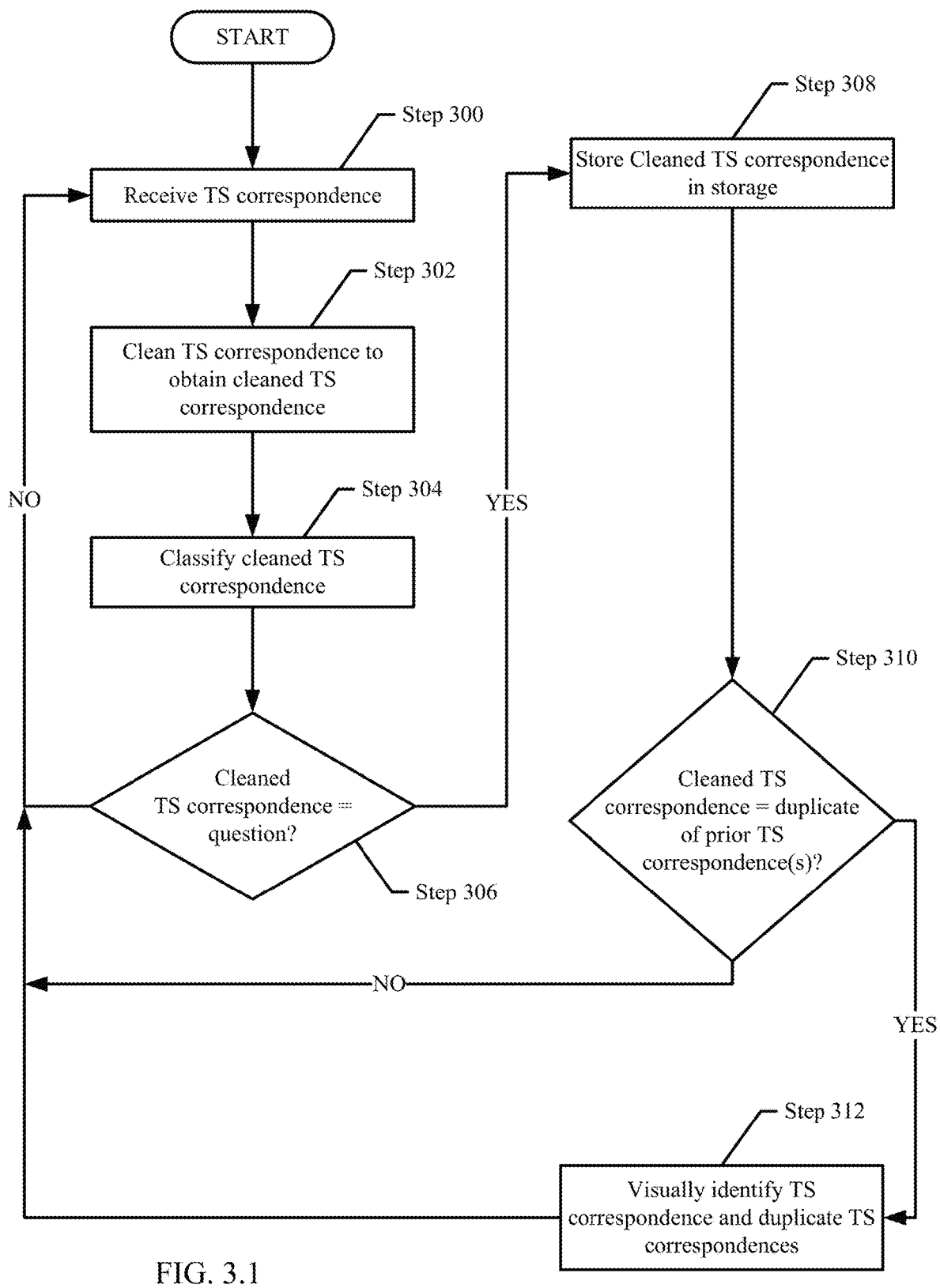
FIG. 3.1

| Time 1 | Customer | Global Protect VPN not working? |
| Time 2 | TSP | Thanks for reaching out to the tech support. How may I help you? |
| Time 3 | Customer | I am unable to connect to Global Protect VPN. |
| Time 4 | TSP | Hello Priyansh. I understand you are unable to login to global protect. |
| Time 5 | TSP | What is the error when logging in? |
| Time 6 | Customer | I do not see any error logs but it shows "Unable to connect". Can you please tell me how to connect with the VPN? |
| Time 7 | TSP | What is your username? |
| Time 8 | Customer | End_User |
| Time 9 | TSP | Ok, I checked your account and see there are no issues with your account. |
| Time 10 | Customer | But I am unable to connect to Global Protect VPN. Why? |
| Time 11 | TSP | Send me a screenshot of the page you are on in Global Protect. |
| Time 12 | Customer | [Shares the screenshot] |
| Time 13 | TSP | Ok, checked and see there are no issues with the account or password. |
| Time 14 | Customer | But my VPN is not connecting? What should I do? |
| Time 15 | TSP | What's the error? |
| Time 16 | Customer | It's not accepting my password and shows authentication failed. |
| Time 17 | TSP | Ok, I have created a ticket for the same. The concerned team will reach out to you. |

FIG. 3.2

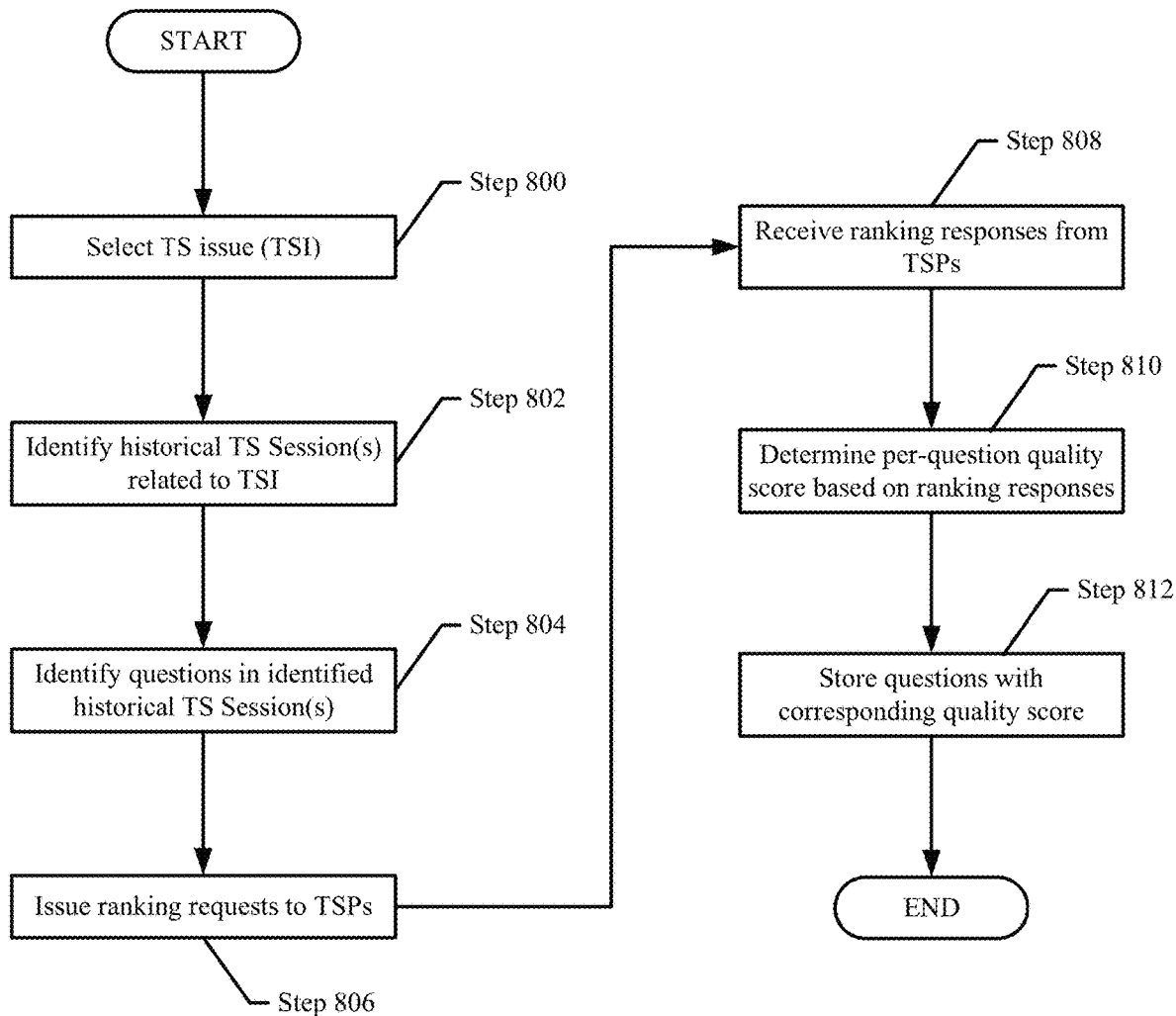
FIG. 8.1

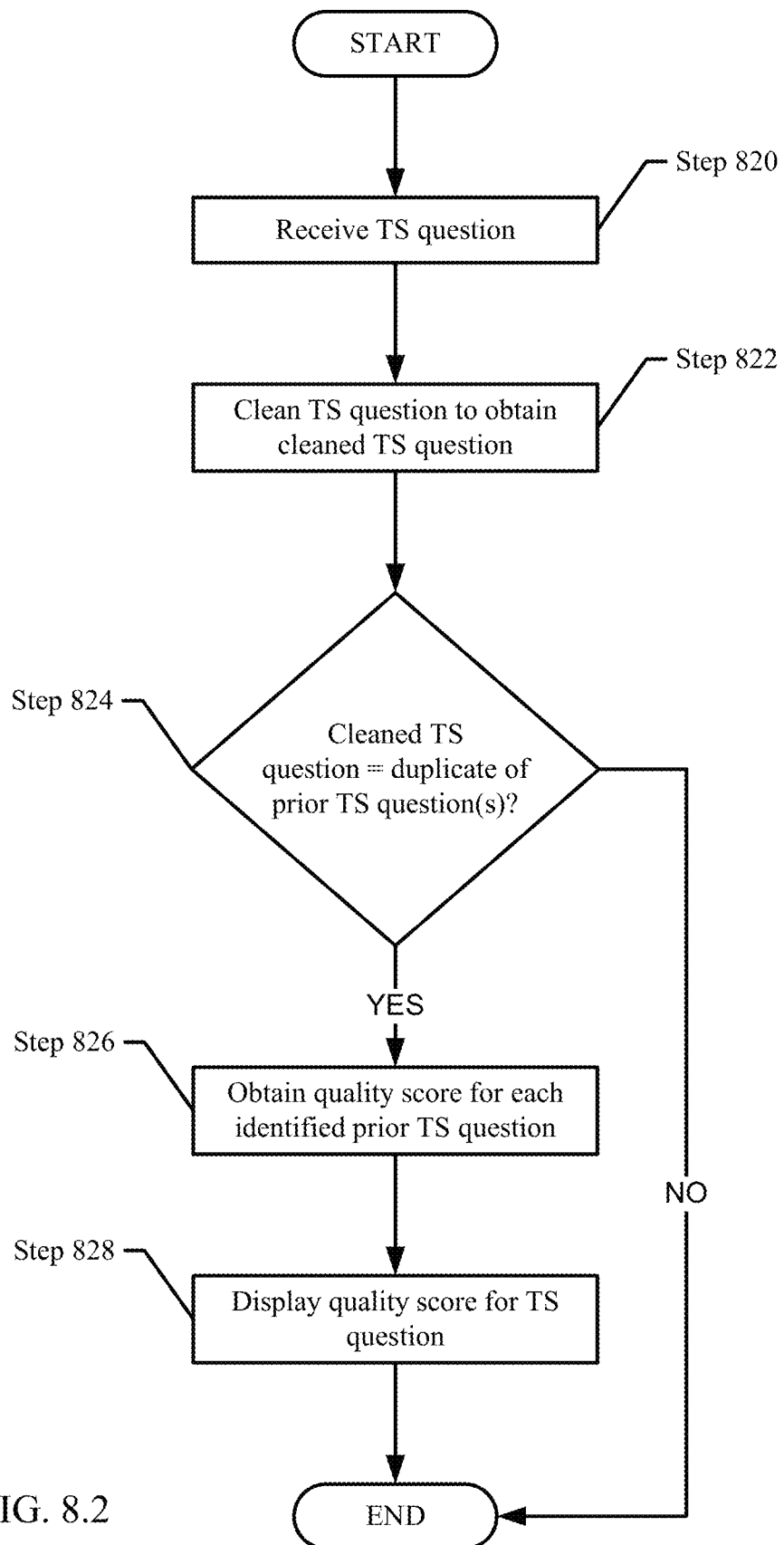
FIG. 8.2

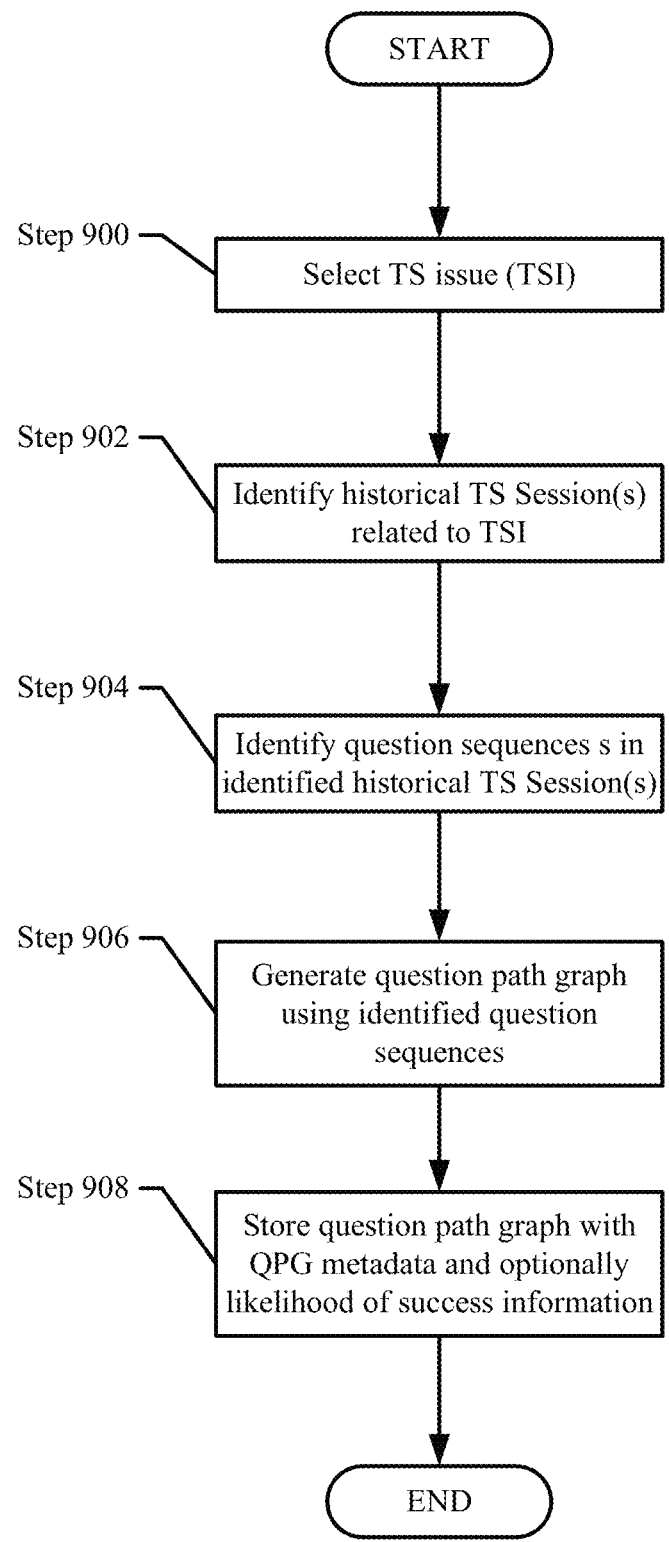
FIG. 9.1

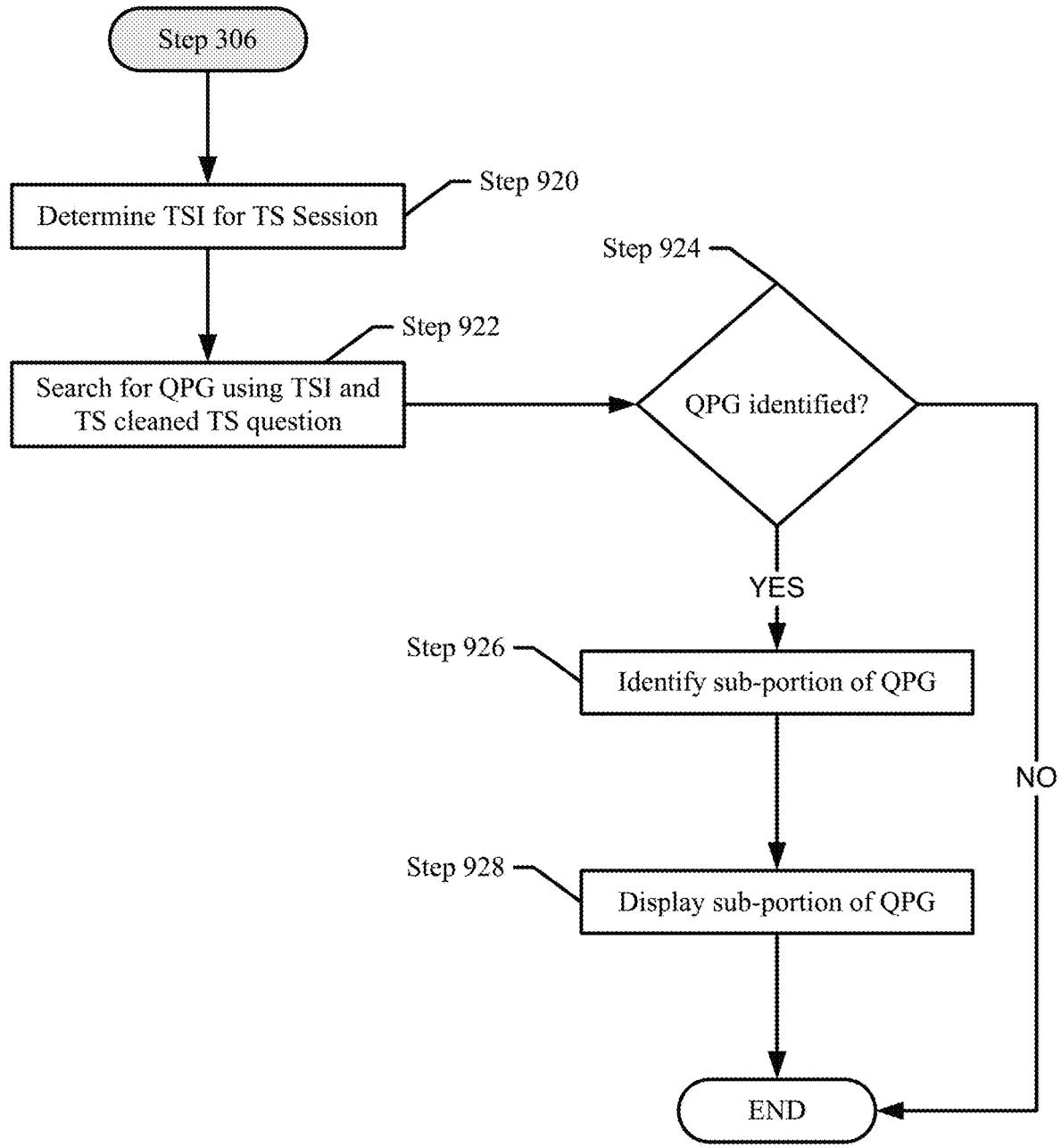
FIG. 9.2

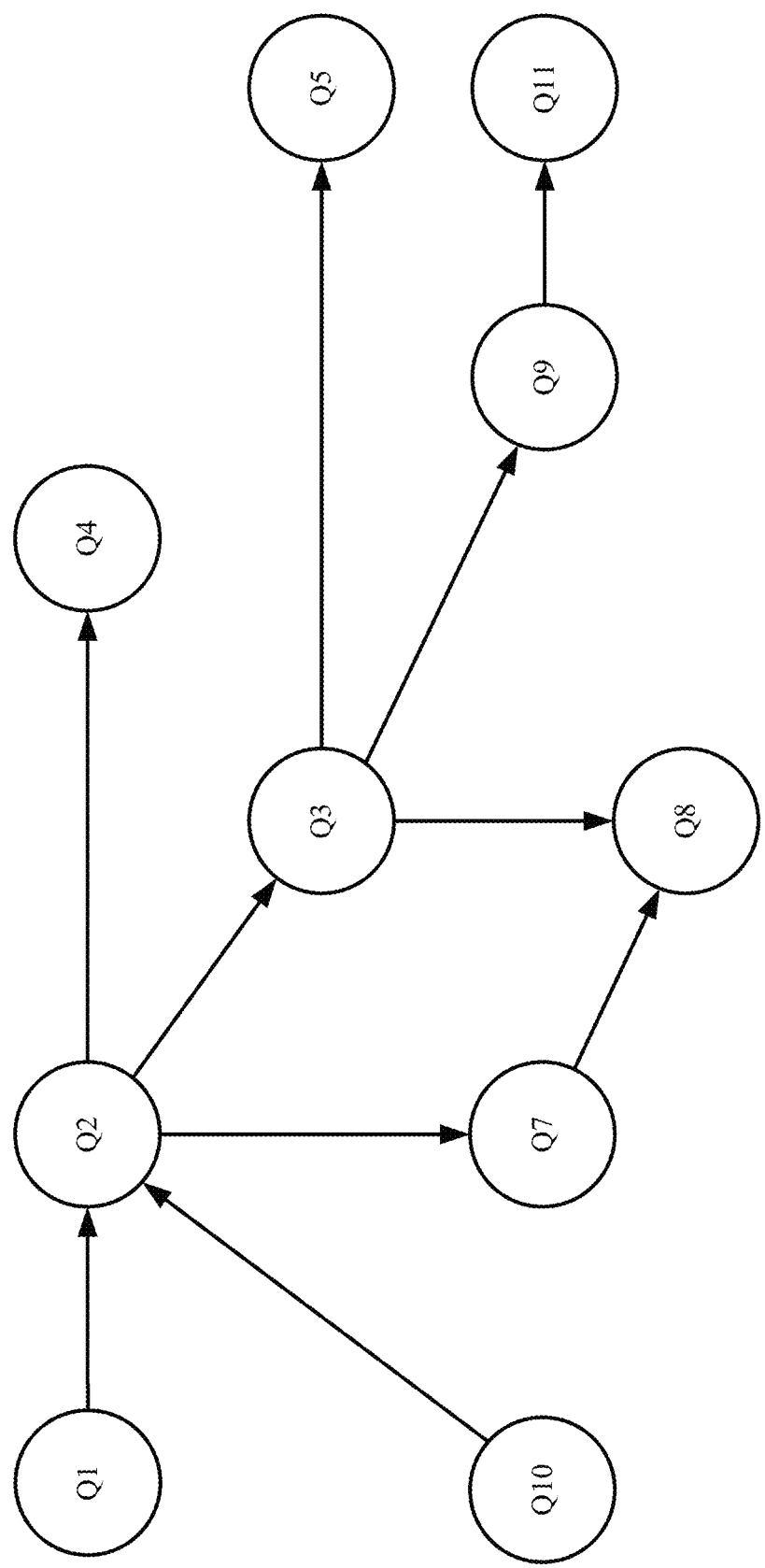
FIG. 9.3

METHOD AND SYSTEM FOR IMPLEMENTING A PRE-CHECK MECHANISM IN A TECHNICAL SUPPORT SESSION

BACKGROUND

Once computing systems are deployed, customers of these computing systems often encounter issues with the operation of these computing systems. The customers typically try to solve these issues internally, but when they cannot resolve these issues, they often contact technical support to assist them in solving the issues with their computing systems.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a system in accordance with one or more embodiments of the invention.

FIG. 1.2 shows a technical support region in accordance with one or more embodiments of the invention.

FIG. 2.1 shows a technical support system (TSS) in accordance with one or more embodiments of the invention.

FIG. 2.2 shows a technical support person (TSP) support module in accordance with one or more embodiments of the invention.

FIG. 3.1 shows a method to detect duplicate questions in a technical support session and provide visual feedback based on the detection system in accordance with one or more embodiments of the invention.

FIG. 3.2 shows an exemplary visual stream in accordance with one or more embodiments of the invention.

FIG. 8.1 shows a method to process questions in completed technical support sessions in accordance with one or more embodiments of the invention.

FIG. 8.2 shows a method to perform question pre-checking in accordance with one or more embodiments of the invention.

FIG. 9.1 shows a method to generate a question path graph in accordance with one or more embodiments of the invention.

FIG. 9.2 shows a method for using a question path graph in a technical support session in accordance with one or more embodiments of the invention.

FIG. 9.3 shows an example of a question path graph in accordance with one or more embodiments of the invention.

DETAILED DESCRIPTION

Figure 4:
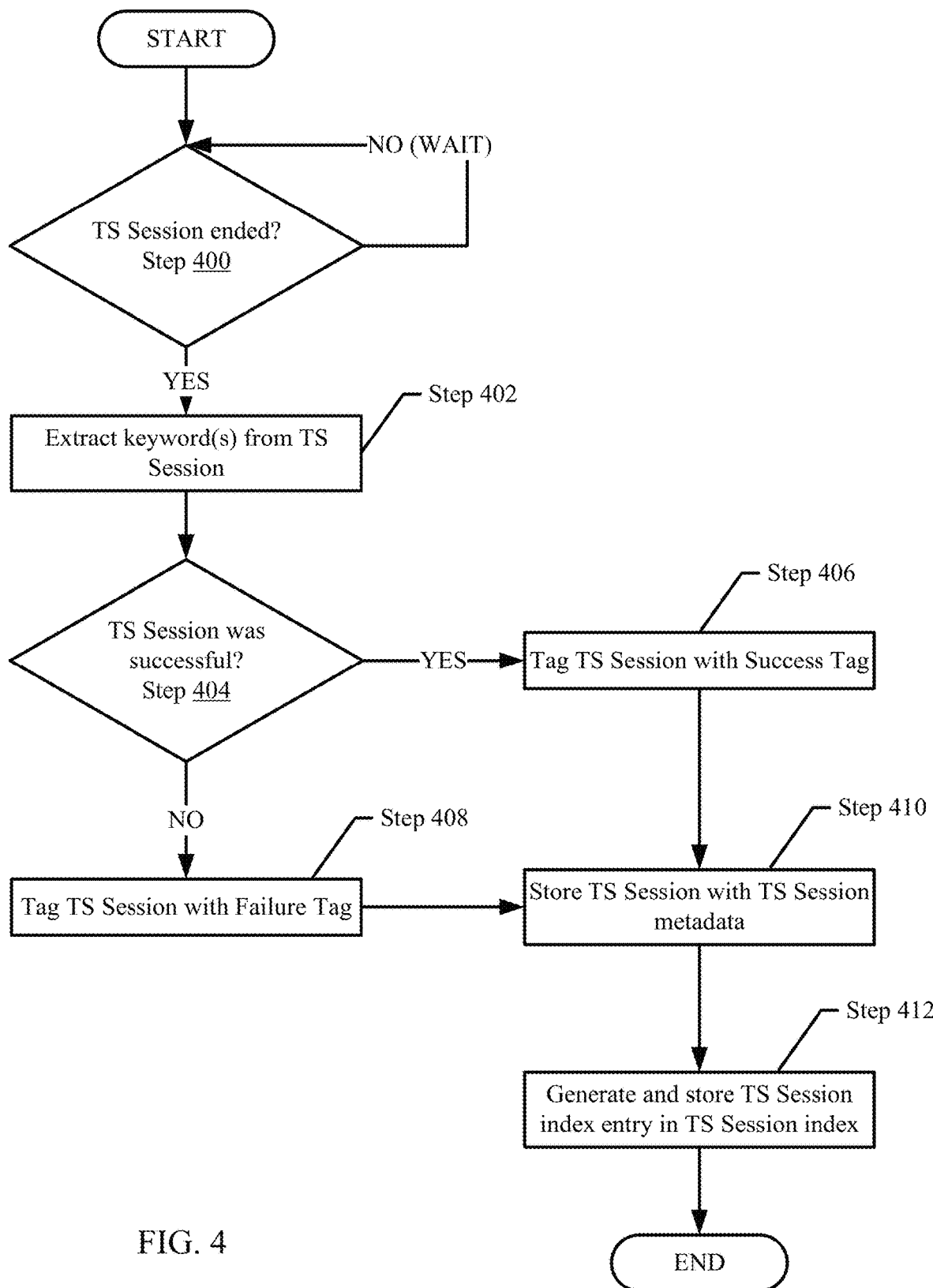
FIG. 4 shows a method to process technical support sessions in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

In general, embodiments of the invention relate to a method and system providing real-time or near real-time visual feedback to technical support personnel (TSPs) during a technical support (TS) session. More specifically, various embodiments of the invention analyze the TS session being conducted by the TSP and historical TS sessions. Based on this analysis, the technical support system (TSS) is able to provide feedback to the TSP in real-time or near real time in order to aid the TSP in successfully resolving the customer's issue(s) in the TS session.

More specifically, in various embodiments of the invention discussed below, the TS sessions conducted by different TSPs using different TSSs are analyzed in order to rank the TS sessions and/or rank the questions (also referred to as TS questions) in the TS sessions (see e.g., FIG. 4 and FIG. 8.1). This analysis may then be used by the TSS and/or distributed to other TSSs (see e.g., FIG. 5) and then used to: (i) identify relevant historical TS sessions, which may be of use to the TSP in resolving an issue in a current TS session (see e.g., FIG. 6 and FIG. 7); (ii) pro-actively check whether a given question that that TSP intends to ask will likely bring the TSP closer to resolving the customer's issue (see e.g., FIG. 8.2); and (iii) generate question path graphs (QPGs) and display relevant portions of the QPG(s) to the TSP (see e.g., FIGS. 9.1-9.3).

Uses (i)-(iii) described above (either separately or in any combination) enable the TSP to receive real time or near-real time visual feedback on the TSS while they are conducting a TS session.

Further, uses (i)-(iii) may be enhanced in various embodiments of the invention by using TS sessions conducted by different TSPs with different customers. By increasing the TS sessions that are analyzed, each TSP is able to get the benefit of the collective knowledge of the TSPs. In this manner, if one TSP has a successful TS session or an unsuccessful TS session, another TSP may use this information to either adopt a similar approach in a TS session that includes the same technical issue or adopt a different approach in a TS session that includes the same technical issue.

The following describes various embodiments of the invention.

FIG. 1.1 shows a system in accordance with one or more embodiments of the invention. The system includes one or more technical support hubs (TSHs) (100) operatively connected technical support systems (not shown) one or more technical support regions (TSRs) (e.g., technical support region A (102), technical support region N (104)).

Figure 10:
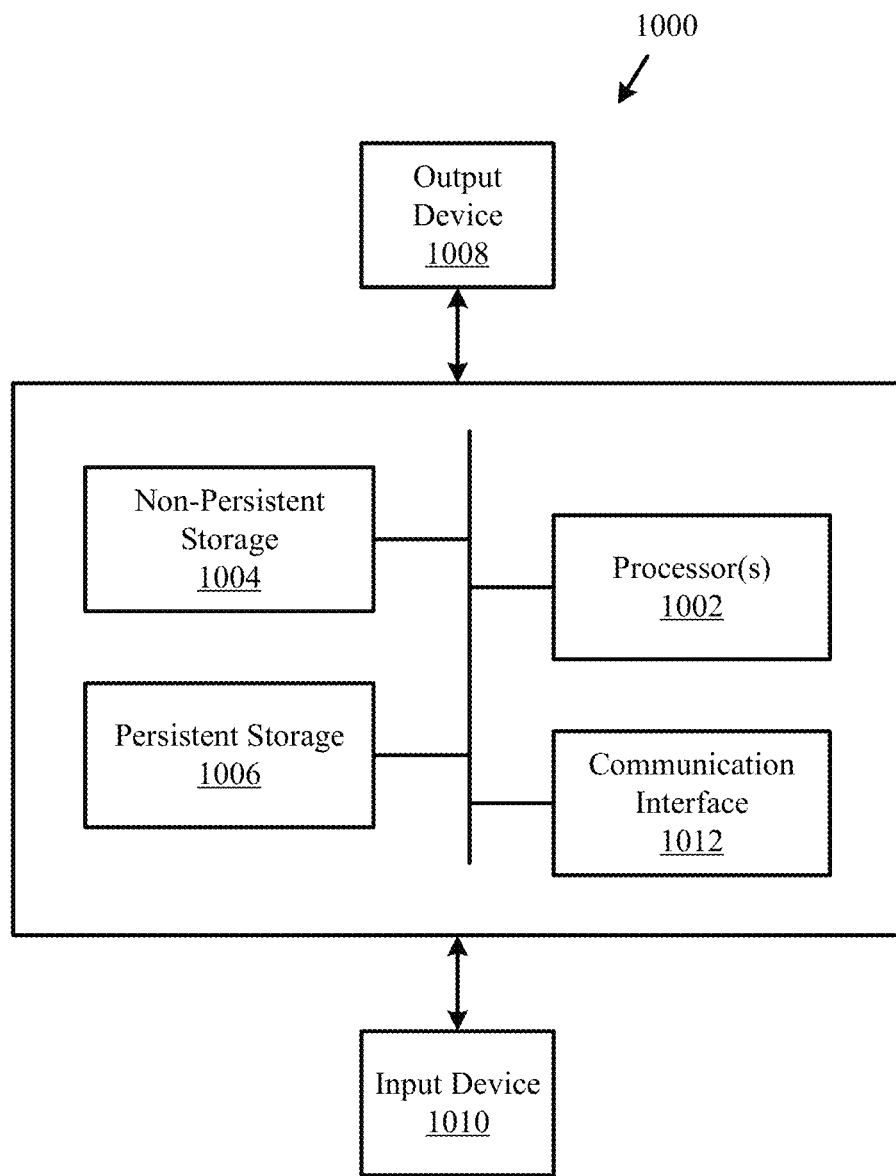
FIG. 10 shows a diagram of a computing device in accordance with one or more embodiments of the invention.

In one or more embodiments of the invention, the TSH(s) (100) are implemented as a computing device (see e.g., FIG. 10). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device, cause the computing device to perform the functionality of the TSHs (100) described throughout this application.

In one or more embodiments of the invention, the TSHs (100) are implemented as a logical device. The logical device may utilize the computing resources of any number of computing devices and thereby provide the functionality of the TSHs (100) described throughout this application.

In one or more embodiments of the invention, the TSRs (102, 104) correspond to geographic regions (e.g., cities, counties, states, provinces, countries, country groupings (e.g., the European Union)) in which TSS (not shown) are located. In order to facilitate the sharing of information between the TSSs in the various TSRs, the TSSs may transmit information to the TSH(s) and the TSH(s) may distribute the information to other TSSs in other TSRs. In this configuration, the TSH(s) serve as a hub in a hub-spoke architecture.

In another architecture, the TSH(s) maintains information about the TSSs and then provides this information to the TSSs. The TSSs then send information to and receive information from other TSSs directly. In this configuration, the TSSs operate in a point-to-point architecture and only rely on the TSH(s) to discover other TSSs.

Each of the TSSs (not shown) in the TSRs (102, 104) and the TSH(s) (100), may be operably connected to each other via any combination of wired and/or wireless connections.

Various embodiments related to the distribution of information between the TSS(s) using the TSH(s) is described below in FIGS. 2.1 and 5. Further, additional detail about the operation of the TSSs is provided below in, e.g., FIGS. 2.1-2.2.

FIG. 1.2 shows a technical support region (TSR) in accordance with one or more embodiments of the invention. The TSR (106) includes one or more clients (120) and one or more technical support systems (TSSs) (150). The TSR may include additional, fewer, and/or different components without departing from the invention. Each component may be operably connected to any of the other components via any combination of wired and/or wireless connections. Each component illustrated in FIG. 1.2 is discussed below.

The customer may determine that it needs to contact a TSP to address a technical support issue. The technical support issue may be on a client (120) that the customer is using or on another device (not shown) that the customer is using. The technical support issue may be any issue that prevents (or impairs) that customer's ability to access and/or use: (i) the client, (ii) another device (which may be logical or physical), any applications, and/or functionality of the client, and/or another device.

In one or more embodiments of the invention, the clients (120) correspond to devices (which may be physical or logical, as discussed below) that the customer is using to interact with the TSSs (150). In one or more embodiments of the invention, each client (120A, 120L) is implemented as a computing device (see e.g., FIG. 10). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device, cause the computing device to perform the functionality of each client (120A, 120L) described throughout this application.

In one or more embodiments of the invention, each client (120A, 120L) is implemented as a logical device. The logical device may utilize the computing resources of any number of computing devices, and thereby provide the functionality of the client (120A, 120L) described throughout this application.

In one or more embodiments of the invention, each of the TSSs (150) is a system used by a TSP to interact with the customers (via the clients (120)) in order to resolve technical support issues. The TSSs (150) provide the functionality of the described throughout this application and/or all, or a portion thereof, of the methods illustrated in FIGS. 3.1-9.3.

In one or more embodiments of the invention, the TSSs (150, 150A, 150M) are implemented as a computing device (see e.g., FIG. 10). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device, cause the computing device to perform the functionality of the TSSs (150) described throughout this application.

In one or more embodiments of the invention, the TSSs (150) are implemented as a logical device. The logical device may utilize the computing resources of any number of computing devices and thereby provide the functionality of the TSSs (150) described throughout this application. Additional detail about the TSSs (150) are provided in FIGS. 2.1-2.2 below.

FIG. 2.1 shows a technical support system with one or more embodiments of the invention. The TSS (200) includes an input module (202), TSP support module (204), storage (206), a compliance manager (208), a translator (210), and a visualization module (212). Each of these components is described below.

In one embodiment of the invention, the input module (202) is any hardware, software, or any combination thereof that includes functionality to receive TS correspondence(s). The TS correspondence corresponds to a question, answer, or any other communication that is generated by the customer and sent to the TSP as part of a technical support session. Examples of TS correspondences are provided in FIGS. 3.1-3.2 below. The visualization module (212) may be implemented using hardware, software, or any combination thereof. Additional details about various embodiments of the TSP support module (204) are provided in FIG. 2.2.

In one embodiment of the invention, the TS correspondence may be received in the form of (i) digital audio data, (ii) text corresponding to a transcription of an audio signal (regardless of the type of audio signal), and/or text generated by a customer and sent via a client to the TSS.

In one embodiment of the invention, TS correspondence is generated on the client by encoding an audio signal in a digital form and then converting the resulting digital audio data into one or more TS correspondences. The conversion of the digital audio data into one or more TS correspondences, may include applying an audio codec to the digital audio data, to compress the digital audio data prior to generating the TS correspondences. The use of the audio codec may enable a smaller number of TS correspondences to be sent to the TSS.

In one embodiment of the invention, the audio signal may be obtained from a customer speaking into a microphone on the client. Alternatively, the audio signal may correspond to a pre-recorded audio signal that the customer provided to the client using conventional methods. In other embodiments of the invention, the client may receive the digital audio data directly instead of receiving an analog audio signal. In other embodiments of the invention, the audio signal may be computer generated.

In one embodiment of the invention, the audio signal includes one or more audio utterances. An audio utterance corresponds to a unit of speech bounded by silence. The utterance may be a word, a clause, a sentence, or multiple sentences. A text utterance corresponds to a unit of speech (in text form) that is provided by a user or system, where the unit of speech may be a word, a clause, a sentence, or multiple sentences. Embodiments of the invention apply to both types of utterances. Further, unless otherwise specified, "utterance" means either an audio utterance, a text utterance, or a combination thereof.

In one embodiment of the invention, when the TS correspondence is an audio signal, then the input module (202) includes functionality to convert the audio signal into text using any known or later discovered speech-to-text conversion application (which may be implemented in hardware, software, or any combination thereof).

While the input module (202) may receive TS correspondences from the client in any format, the result of the processing of the received TS correspondences is a text format of the TS correspondences. The text format of the TS correspondences may then be used by the other components in the TSS.

In one embodiment of the invention, once the TS correspondence is converted into a text format, the TS correspondence may be cleaned. Cleaning the TS correspondence may include identifying and correcting grammatical and/or punctuation mistakes. For example, the TS correspondence: "I does not see any error logs but it show "Unable to connect". Can you please tell me how to connect with the VPN.", is corrected to "I do not see any error logs but it shows "Unable to connect". Can you please tell me how to connect with the VPN?"

While not required, by cleaning the TS correspondences prior to passing the TS correspondences to other components in the TSS, the other components in the TSS may be able to more accurately process the TS correspondences to determine whether there are duplicate TS correspondences.

In one embodiment of the invention, the TSP support module (204) includes functionality to analyze the TS sessions and, based on the analysis, provide feedback to the TSP(s) to enable the TSPs more efficiently resolve TS sessions to the satisfaction of the customer. The TSP support module include functionality to implement some or all of the functionality described in FIGS. 3.1-9.3. Additional detail about the TSP support module is provided in FIG. 2.2. The TSP support module (204) may be implemented using hardware, software, or any combination thereof.

In one embodiment of the invention, the storage (206) corresponds to any type of volatile or non-volatile (i.e. persistent) storage device that includes functionality to store TS correspondence that is classified as an imperative (i.e., classified as a question) by the duplicate question module (FIG. 2.2, 220) (described below). The storage (206) may store the TS correspondence, and the corresponding reply (replies), from the TSP related to the TS correspondence.

For example, consider a scenario in which the following TS correspondence is received by the TSS:
Customer: "I do not see any error logs but it shows "Unable to connect". Can you please tell me how to connect with the VPN?"
In response to this TS correspondence, the TSP replies:
TSP: "Ok, I checked your account and see there are no issues with your account."

In this example, the TS correspondence from the customer is classified as a question and then is stored in the storage. Further, the response from the TSP may also be stored in the storage and associated with the aforementioned TS correspondence.

In addition to storing the TS correspondence and the TSP's reply (replies), the storage may also store information that identifies the TS session, and a time stamp(s) for the TS correspondence, and TSP reply (replies). In one embodiment of the invention, the TS correspondences (and, if stored, the associated TSP replies) are stored on a per-TS session basis.

The storage may maintain the TS correspondence and the TSP's reply (replies) for the duration of the TS session with which they are associated. The TS correspondences (and, if stored, the associated TSP replies) are maintained (or exported, see e.g., FIG. 5) and then used to train (or update the training of) the duplicate question module (220).

In various embodiments of the invention, the storage (206) may also store one or more of the following: (i) locally-generated TS sessions (i.e., TS sessions generated by TSPs using the TSS); (ii) remotely-generated TS sessions (i.e., TS sessions generated by TSPs using remote TSSs); (iii) TS session metadata (TSSM) (described below) associated with (i) or (ii); (iv) question path graph(s) (see e.g., FIGS. 9.1-9.3) and (v) an index(es) to enable the efficient identification and retrieval of content in the storage. The content stored in the storage may be stored in a native language and/or in a default language. See e.g., FIG. 5.

In one embodiment of the invention, the compliance manager (208) includes one or more sharing compliance rules, which dictate what content stored in the storage may be exported (or not exported) to other TSSs (which may or may not be in the same TSR). Further, sharing compliance rules may be based on: (i) rules, laws, and/or regulations (also referred to as compliance rules) in the legal jurisdiction in which the TS S is located and/or (ii) the policies and/or rules of the legal entity (e.g., company) that operates the TSS. The compliance manager (208) may be updated whenever this is a change in (i) or (ii). Further, there may be scenarios in which certain portions of, e.g., a TS session may be exported while other portions of the TS session may not be exported. In such scenarios, the compliance manager may dictate how to modify the TS session in order for it to be exported. Additional detail is provided in FIG. 5.

In one embodiment of the invention, the translator (210) is configured to: (i) translate locally-generated TS sessions from the native language of the TSS to a default language and (ii) to translate remotely-generated TS sessions from the default language to the native language of the TSS. The native language of the TSS is the language that the TSP uses in the TS session to communicate with the customer. The default language corresponds to the language into which the content from the storage is translated prior to being exported. A default language is used in order to have a common language in which to export content to other TSSs and to import content from other TSSs. By using a common language, the individual TSSs only need to be able to translate between the default language and their native language; instead of being required to implement translation between any arbitrary language and the native language of the TSS. If the TSS' native language is the same as the default language, then the translator may not be present (or utilized) in the TSS. The translator (210) may be implemented using hardware, software, or any combination thereof.

In one embodiment of the invention, the visualization module (212) includes functionality to: (i) receive TS correspondences (or clean TS correspondences), and corresponding TSP replies, and display the aforementioned content on a graphical user interface (GUI) of the TSS as a visual stream (e.g., FIG. 3.2) that is ordered by time; and (ii) visually indicate (highlight or link) duplicative TS correspondence within the visual stream, and/or in a separate window(s) on the GUI (e.g., one per set of duplicative questions). In one embodiment of the invention, the visualization module may not modify the visual stream of the TS session; rather, the visualization module concurrently displays one or more separate windows in the GUI that show the duplicative TS correspondences and the corresponding TSP reply (replies).

In one embodiment of the invention, if the TSP is concurrently handling multiple TS sessions, then the visualization module may perform the aforementioned functionality of a per-TS session basis.

Further, the visualization module (212) includes functionality to generate visualizations as described below in FIGS. 3.1-9.3. The visualization module (212) may be implemented using hardware, software, or any combination thereof.

FIG. 2.2 shows a technical support person (TSP) support module in accordance with one or more embodiments of the invention. The TSP support module includes a duplicate question module (220), a pre-check module (222), a question path graph (QPG) module (224), a post-TS session feedback module (226), and a historical TS Session identification module (228). Each of these modules is described below.

In one embodiment of the invention, the duplicate question module (220) includes a classifier (not shown). In one embodiment of the invention, the classifier includes functionality to classify the TS correspondence as: (i) imperative (i.e., a question), (ii) declarative (i.e., a statement), or (iii) imperative (i.e., a command) The classifier may be trained using TS correspondence from other TS sessions and/or using any other known or later discovered natural language processing (NLP) model(s). The classifier may be obtained from any source and may be trained using any form of training data. Further, the classifier may be periodically updated as there are improvements in the NLP model(s), and/or the NLP model(s) are trained using more appropriate training data. The classifier may be implemented using hardware, software, or any combination thereof.

In one embodiment of the invention, in addition to the functionality provided by the classifier, the duplicate question module (220) includes functionality to determine whether a given TS correspondence is duplicative of a prior received TS correspondence(s). For example, the duplication question model may indicate that the following questions are duplicative (with varying confidence levels):

Customer: "Global Protect VPN not working?"
Customer: "Can you please tell me how to connect with the VPN?"
Customer: "But I am unable to connect to Global Protect VPN Why?"
Customer: "But my VPN is not connecting? What should I do?"

The duplicate question module (220) may be implemented using hardware, software, or any combination thereof. The duplicate question module may be trained using TS correspondence from other TS sessions and/or using any other known or later discovered natural language processing (NLP) model(s). The duplicate question module may be obtained from any source and may be trained using any form of training data. Further, the duplicate question module may be periodically updated as there are improvements in the NLP model(s) and/or the NLP model(s) are trained using more appropriate training data.

The duplicate question module (220) may include functionality to determine whether a pair of TS correspondences (i.e., the TS correspondence that was most recently received and a prior received TS correspondence). The duplicate question module may perform the duplication analysis on the TS correspondence that was most recently received and all (or at least a portion) of the prior received TS correspondences for the TS session. The result of processing the received TS correspondence is an identification of zero, one, or more pairs of duplicative TS correspondences.

In one embodiment of the invention, the duplicate question module (220), generates values for one or more input parameters for a given pair of TS correspondences for a TS session, and then uses them as input into a Light Gradient Boosting Machine. The result of processing the aforementioned input values using the Light Gradient Boosting Machine is a binary result, which indicates whether or not the two TS correspondences are duplicative (i.e., similar to each other).

In one embodiment of the invention, once a pair of TS correspondences are determined to be duplicates by the duplicate question module, the storage may be updated to indicate that the pair of TS correspondences are duplicative. By tracking the duplicative TS correspondences, the TSS may be able to more efficiently identify sets of related TS correspondences.

For example, consider a scenario in which the customer sends Q1 at Time (T) 1 and Q2 at T2 and the duplicate question module determines that Q1 and Q2 are duplicative. Following this determination, the customer sends Q3 at T3;

if the storage is tracking that Q1 and Q2 are duplicative, then, if the duplicate question module determines that Q3 is duplicative of Q1, then it will not need to check if Q3 is duplicative of Q2. Since the duplicate question module has already determined that Q1 is duplicative of Q2 then, as such, Q3 is deemed to also be duplicative of Q2 even though no independent comparison of Q2 and Q3 is performed by the duplicate question module.

The duplicate question module (220) includes functionality to perform the method shown in FIGS. 3.1-3.2. The duplicate question module (220) may be implemented using hardware, software, or any combination thereof.

In one embodiment of the invention, the pre-check module (222) includes functionality to enable a TSP to obtain some initial feedback about whether a question that the TSP would like to ask the customer will be helpful in successfully resolving the customer's issue that is the subject of the TS session. The pre-check module (222) includes functionality to perform all or portion of the method shown in FIGS. 8.1-8.2. The pre-check module (222) may be implemented using hardware, software, or any combination thereof.

In one embodiment of the invention, the question path graph (QPG) module (224) includes functionality to analyze historical TS sessions to extract question sequences. The question sequences for a given historical TS session corresponds to the ordered set of questions that the TSP asked the customer during the historical TS session. The QPG module (224) uses the question sequences to generate per-technical support issue QPGs. These QPG are directed graphs that include the various identified question sequences. The QPG module (224) further includes functionality to identify a relevant QPG for a given TS session and then identify the portion of the identified QPG to display to the TSP. The QPG module (224) includes functionality to perform all or portion of the method shown in FIGS. 8.1-8.2. The pre-check module (222) may be implemented using hardware, software, or any combination thereof.

In one embodiment of the invention, the post-TS session feedback module (226) includes functionality to obtain feedback from the TSP(s) about TS sessions. More specifically, the post TS session feedback module (226) may solicit feedback from TSPs about: (i) whether a given TS session was successful or unsuccessful, (ii) a ranking of the success of a given TS session in resolving the customer's issue; (iii) identification of the technical support issue (TSI) that was the subject of the TS session; (iv) which questions in the TS session were helpful in ultimately resolving the customer's issue; (v) which questions in the TS session were unhelpful in ultimately resolving the customer's issue; and (vi) ranking the questions identified in (iv) and (v).

The post-TS session feedback module (226) also includes functionality to generate an index(es) for the historical TS sessions, where the index(es) include one or more of the following: (i) customer information about the customer (which may be a person and/or legal entity) associated with the historical TS session, (ii) keywords extracted from the historical TS session that related to a TSI, (iii) one or more TSI tags (i.e., keywords that identify the technical support issue that was the subject of the TS session) provided by one or more TSPs; and/or (iv) any other information that may be used to efficiently identify the historical TS session(s). The aforementioned content may also be stored as TS session metadata with the corresponding TS session(s).

In one embodiment of the invention, the post-TS session feedback module (226) also includes functionality to perform all or a portion of the method shown in FIGS. 4 and 8.1. The post TS session feedback module (226) may be implemented using hardware, software, or any combination thereof.

In one embodiment of the invention, the historical TS Session identification module (228) includes functionality to obtain various inputs from the TSP and/or from the TS session and then identify one or more historical TS sessions. In one embodiment of the invention, the historical TS Session identification module (228) also includes functionality to perform all or portion of the method shown in FIGS. 6 and 7. The historical TS Session identification module (228) may be implemented using hardware, software, or any combination thereof.

FIG. 3.1 shows a flowchart of a method in accordance with one or more embodiments of the invention. The method depicted in FIG. 3.1 may be performed to detect duplicate questions in a technical support session and provide visual feedback based on the detection. The method shown in FIG. 3.1 may be performed by, for example, a technical support system (e.g., 200, FIG. 2.1). Other components of the system in FIGS. 1.1-2.2 may perform all, or a portion, of the method of FIG. 3.1 without departing from the invention.

While FIG. 3.1 is illustrated as a series of steps, any of the steps may be omitted, performed in a different order, additional steps may be included, and/or any or all of the steps may be performed in a parallel and/or partially overlapping manner without departing from the invention.

In step 300, TS correspondence, as part of a TS session, is received from a customer (via a client) by the input module and, as necessary, converted into a text format. In one embodiment of the invention, a TS session starts when the customer (via the client) sends a TS correspondence to a TSP, and ends when either the customer or the TSP ends the TS session (e.g., by the customer not sending TS correspondences for a pre-determined period of time, by the customer or TSP, closing a communication session, etc.).

In step 302, the TS correspondence is cleaned to obtain cleaned TS correspondence. Though not shown in FIG. 3.1, once the TS correspondence is cleaned (or after the TS correspondence is received if no cleaning is required or performed), it is provided to the visualization module to display as part of a visual stream on a GUI of the TSS.

In step 304, the TS correspondence (which may or more not be cleaned) is classified using the classifier to obtain a classification, which may be a question classification (i.e., a classification that indicates that the TS correspondence is a question), or a non-question classification (i.e., one or more classifications that indicate the TS correspondence is not a question, e.g., it is a command or a statement).

In step 306, a determination is made about whether the TS correspondence (which may or more not be cleaned) is classified as a question. If the TS correspondence (which may or may not be cleaned) is classified as a question, the process proceeds to step 308; otherwise, the process proceeds back to step 300 to await receipt of the next TS correspondence to process.

In step 308, the TS correspondence (which may or may not be cleaned) is stored in the storage. Though not shown in FIG. 3.1, once the aforementioned TS correspondence is stored in the storage, the corresponding TSP replies are also stored in the storage and linked (or otherwise associated with the appropriate TS correspondence).

In step 310, the TS correspondence (which may or may not be cleaned) is then processed by the duplicate question module, to determine whether the aforementioned TS correspondence is duplicative of any of the prior TS correspondences for the TS session stored in the storage. If the aforementioned TS correspondence is duplicative of any of the prior TS correspondences for the TS session, then the storage is updated to reflect this determination, and then the process proceeds to step 312.

In step 312, the visualization module visually links the TS correspondence from step 300, with the one or more identified prior TS correspondences for the TS session determined in step 310. Step 312 may include modifying the visual stream in real-time or near real-time once the determination is made that the TS correspondence received in step 300 is duplicative of one or prior TS correspondences for the TS session. In another embodiment of the invention, the TS correspondence may not be added to the visual stream until it has been processed through step 312. Said another way, the TS correspondence is not added to the visual stream until the processing in step 304-312 has been performed.

In one embodiment of the invention, the TS correspondence from step 300, and a prior TS correspondence, are visually linked by highlighting both TS correspondences in the same color. If the TS correspondence from step 300 is duplicative of multiple prior TS correspondences, then all of the TS correspondences may be highlighted with the same color. However, if the TS correspondence from step 300 is determined to be duplicative of a prior set of identified duplicative TS correspondences, then TS correspondence from step 300 is highlighted in the same color, as was previously used, to visually link the prior set of identified duplicative TS correspondences. The invention is not limited to the aforementioned visual linking.

Once step 312 is completed, the process proceeds back to step 300 to await receipt of the next TS correspondence to process.

FIG. 3.2 shows an exemplary visual stream in accordance with one or more embodiments of the invention. In the example shown in FIG. 3.2, the visual stream includes TS correspondences (time (T) 1, T3, T6, T8, T10, T12, T14, T16) and corresponding TSP replies (T2, T4, T5, T7, T9, T11, T13, T15, T17). In this example, the visual stream is for a TS session that starts at T1 and ends at T17 (i.e., the TSP ends the TS session).

At T1, the customer sends a TS Correspondence ("Global Protect VPN not working?"), which is displayed in the visual stream. The TSS determines that the TS Correspondence is a question (Q1) and stores Q1 in the storage. As this is the first question in the storage, there is no processing by the duplicate question module. The TSP relies at T2, where the reply is stored with Q1 in the storage.

At T3-T5, there is additional TS correspondence and TSP replies exchanged, but there are no questions in the TS correspondence received from the customer; thus, this content is only displayed in the visual stream.

At T6, the customer sends a TS Correspondence ("I do not see any error logs but it shows "Unable to connect". Can you please tell me how to connect with the VPN?"), which is displayed in the visual stream. The TSS determines that the TS Correspondence is a question (Q2) and stores Q2 in the storage. As this is the second question in the storage, there is processing by the duplicate question module. The processing by the duplication module results in a determination that Q1 and Q2 are duplicative. In response to this determination, the visualization module highlights Q1 and Q2 in the visual stream. The TSP replies at T7, where the reply is stored with Q2 in the storage.

At T8-T9, there is additional TS correspondence and TSP replies exchanged, but there are no questions in the TS correspondence received from the customer; thus, this content is only displayed in the visual stream.

At T10, the customer sends a TS Correspondence ("But I am unable to connect to Global Protect VPN. Why?"), which is displayed in the visual stream. The TSS determines that the TS Correspondence is a question (Q3) and stores Q3 in the storage. As this is the third question in the storage, there is processing by the duplicate question module. The processing by the duplication module results in a determination that Q1 and Q3 are duplicative. In response to this determination, the visualization module highlights Q3 in the visual stream with the same color as Q1 and Q2 (which was previously identified as duplicative of Q1). The TSP replies at T11, where the reply is stored with Q3 in the storage.

At T12-T13, there is additional TS correspondence and TSP replies exchanged, but there are no questions in the TS correspondence received from the customer; thus, this content is only displayed in the visual stream.

At T14, the customer sends a TS Correspondence ("But my VPN is not connecting? What should I do?"), which is displayed on in the visual stream. The TSS determines that the TS Correspondence is a question (Q4) and stores Q4 in the storage. As this is the fourth question in the storage, there is processing by the duplicate question module. The processing by the duplication module results in a determination that Q3 and Q4 are duplicative. In response to this determination, the visualization module highlights Q4 in the visual stream with the same color as Q1, Q2, and Q3 (which was previously identified as duplicative of Q1 and Q2). The TSP replies at T15, where the reply is stored with Q4 in the storage.

At T16-T17, there is additional TS correspondence and TSP replies exchanged, but there are no questions in the TS correspondence received from the customer; thus, this content is only displayed in the visual stream. At T17, the TSP ends the TS session.

FIG. 4 shows a method to process technical support sessions in accordance with one or more embodiments of the invention. The method depicted in FIG. 4 may be performed to obtain feedback from TSPs on one or more TS sessions after the TS session has ended. The method shown in FIG. 4 may be performed by, for example, a technical support system (e.g., 200, FIG. 2.1). Other components of the system in FIGS. 1.1-2.2 may perform all, or a portion, of the method of FIG. 4 without departing from the invention.

While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, a determination is made about whether the TS session has ended. The TS session may be ended by the customer or the TSP. Further, depending on how the TS session was conducted, ending the TS session may occur when the TSP and/or the customer closes a chat window, hangs up the phone, etc. The TS session may be ended in any other manner without departing from the invention. If the TS session has ended, the process proceeds to step 402; otherwise, the process waits until the TS session has ended.

Those skilled in the art will appreciate that the TSS may track all active TS sessions and determine whether they have ended; alternatively, the TSS may only track a subset of the TS sessions that are active on the TSS and determine when TS sessions in this subset have ended.

Continuing with the discussion of FIG. 4 in step 402, one or more keywords are extracted from the TS session. The purpose of the keyword extraction is to identify words (or phrases) that may be used by other modules in the TSP support module to identify the TS session (which is referred to as a historical TS session) in the future. To that end, any mechanism for determining keywords may be used without departing from the invention. For example, the keywords may be determined by: (i) prompting the TSP to identify keywords, (ii) using a machine learning algorithm(s) to extract keywords from the TS session, (iii) using (ii) to identify a set of keywords and then having the TSP confirm the keywords that were identified and/or remove keywords that were identified to obtain a verified set of keywords. The keyword extraction may be implemented using any combination of the above mechanisms and/or any other mechanisms without departing from the invention.

In step 404, a determination is made about whether the TS session was successful. The determination in step 404 may be made by prompting the TSP and/or the customer (in scenarios in which the customer provided feedback following the end of the TS session) to indicate whether the TS session was successful. The TS session may be determined to be successful if the TSP and/or the customer both indicate that the technical support issue (TSI) that was the subject of the TS session was successfully resolved. The indication of success may be binary (i.e., the TS session was successful or unsuccessful) or may be denoted on a scale—e.g., a scale from 1-10, where 1 is not successful, 2-9 is partially successful and 10 is completely successful. If the TS is deemed successful, the process proceeds to step 406; otherwise, the process proceeds to step 408.

In step 406, the TS session is tagged with a success tag. The success tag may be added to the TS session metadata. In the event that the determination in Step 404 specifies a value denoting the success of the TS session, then the success tag also includes the value. The TS session metadata may also include the keywords extracted in step 402. The process then proceeds to step 410.

In step 408, the TS session is tagged with a failure tag. The failure tag may be added to the TS session metadata. In the event that the determination in Step 404 specifies a value denoting the success of the TS session, then the failure tag also includes the value. The TS session metadata may also include the keywords extracted in step 402. The process then proceeds to step 410.

In step 410, the TS session (which corresponds to all the TS correspondence between the customer and TSP) is stored along with the TS session metadata in the storage. The TS session and TS session metadata may be stored in the native language and/or in the default language.

In step 412, a TS session index entry for the TS session is generated and stored in the TS session index, which is maintained in the storage. The TS session index includes content that enables efficient identification and retrieval of the TS session and the TS session metadata.

Figure 5:
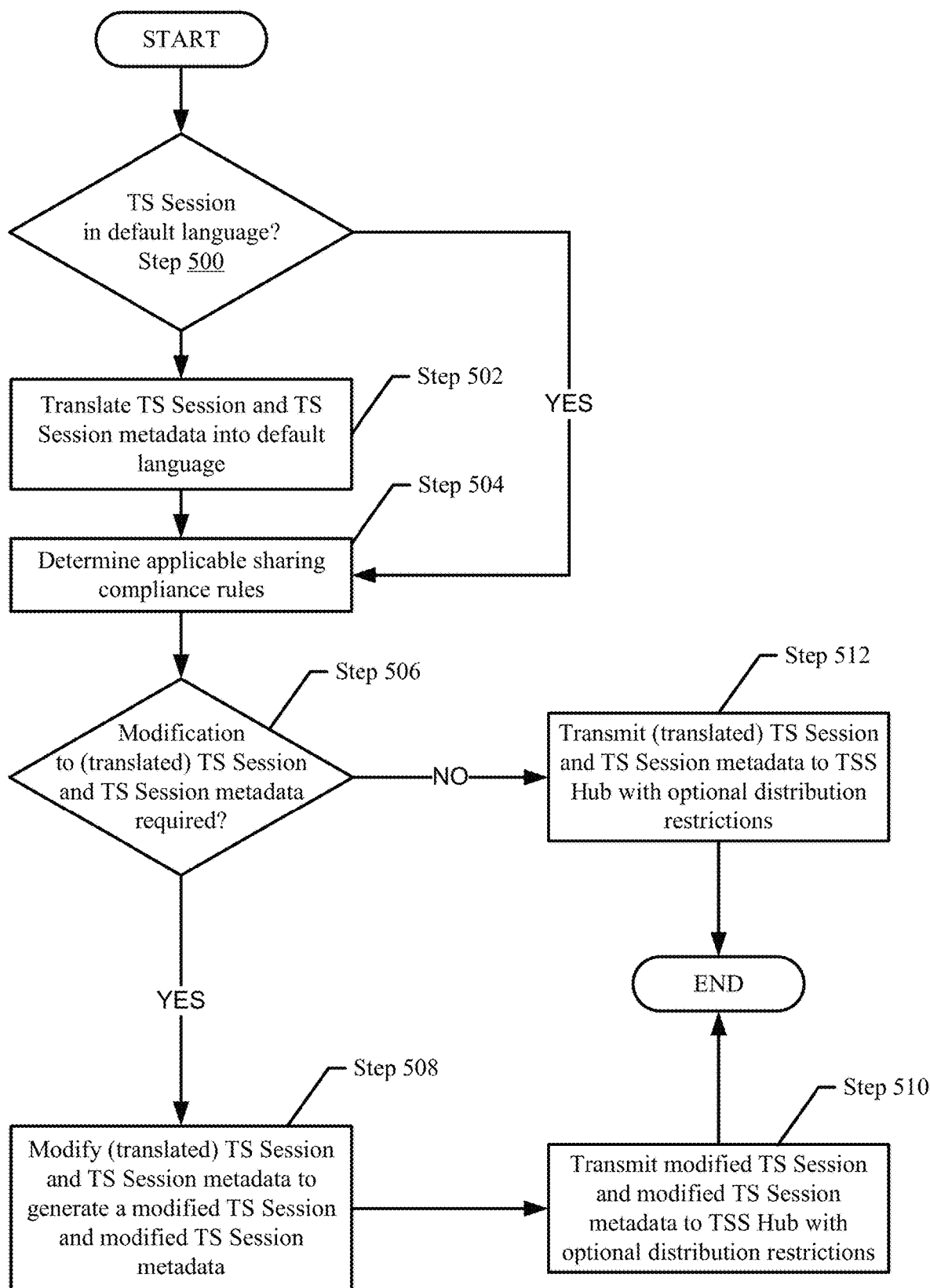
FIG. 5 shows a method to process distribute technical support sessions in accordance with one or more embodiments of the invention.

FIG. 5 shows a method to process distribute technical support sessions to other TSSs in accordance with one or more embodiments of the invention. The method shown in FIG. 5 may be performed by, for example, a technical support system (e.g., 200, FIG. 2.1). Other components of the system in FIGS. 1.1-2.2 may perform all, or a portion, of the method of FIG. 5 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 500, a determination is made about whether the TS session is in a default language. As discussed above, in one embodiment of the invention, to facilitate the sharing of the TS sessions between TSSs, the TS sessions are exported using a common language (referred to the default language). If the TSS' native language is the same as the default language (e.g., the native language and the default language are both English), then there is no need to translate the TS session or TS session metadata and the process proceeds to step 504; otherwise, the process proceeds to step 502.

In step 502, the TS session and the TS metadata are translated from the native language to the default language.

In step 504, the sharing compliance rules (defined above) are obtained. The sharing compliance rules may be periodically updated by the TSPs that uses the TSSs. Alternatively, the TSH may maintain the sharing compliance rules for each of the TSR. In this scenario, the TSH may update the compliance sharing rules as appropriate and then manage the distribution of the updated compliance sharing rules to the appropriate TSSs. Other mechanisms for maintaining and updating the sharing compliance rules may be used without departing from the invention.

In step 506, a determination is made about whether any modification to the TS session and/or TS session metadata is required in view of the sharing compliance rules. The sharing compliance rules may specify that all or a portion of the TS session and/or TS session metadata may not be exported outside the TSR (i.e., the TSR in which the TSS is located) and/or that all or a portion of the metadata must be modified prior to exporting the TS session and/or TS session metadata outside the TSR. If modification is required, the process proceeds to step 508; otherwise, the process proceeds to step 512.

In step 508, the TS session and/or TS session metadata are updated to remove, redact, or replace all content that is not permitted to be exported (as specified in the sharing compliance rules). For example, user names and passwords may be removed, certain types of questions and certain responses may be removed. Further, certain portions of the TS session and/or TS session metadata may be modified per the sharing compliance rules. For example, the sharing compliance rules may require that all personal identifiers are redacted, removed and replaced with anonymized identifiers. In this manner, the TS session and/or TS session metadata can still be used but no personal information is exchanged.

The result of step 508 is a modified TS session and/or modified TS session metadata that may be exported.

In step 510, the modified TS session and/or modified TS session metadata (which may or may not be translated) is exported (via a push or pull mechanism) to the TSS Hub. In scenarios in which the TSSs directly export the modified TS session and/or modified TS session metadata to each other, then step 510 includes direct export (via a push or pull mechanism) to one or more TSSs.

In step 512, the TS session and/or TS session metadata (which may or may not be translated) is exported (via a push or pull mechanism) to the TSS Hub. In scenarios in which the TSSs directly export the TS session and/or TS session metadata to each other, then step 510 includes direct export (via a push or pull mechanism) to one or more TSSs.

In one embodiment of the invention, the TSSs can subscribe to the TSH to receive TS session and TS session metadata from certain other TSSs.

In one embodiment of the invention, the TSH may include a global compliance rule that enforces restrictions between sharing TS session and TS session metadata between certain TSRs. For example, there may be scenarios in which TSSs in TSR 1 may be shared with TSSs in TSR 2 and TSR 3 but not with TSSs in TSR 4. In this scenario, the TSSs in TSR 1 may export TS session and TS session metadata to the TSH but the TSH may restrict the transmit of the TS session and TS session metadata from the TSH to any TSSs in TSR 4.

Figure 6:
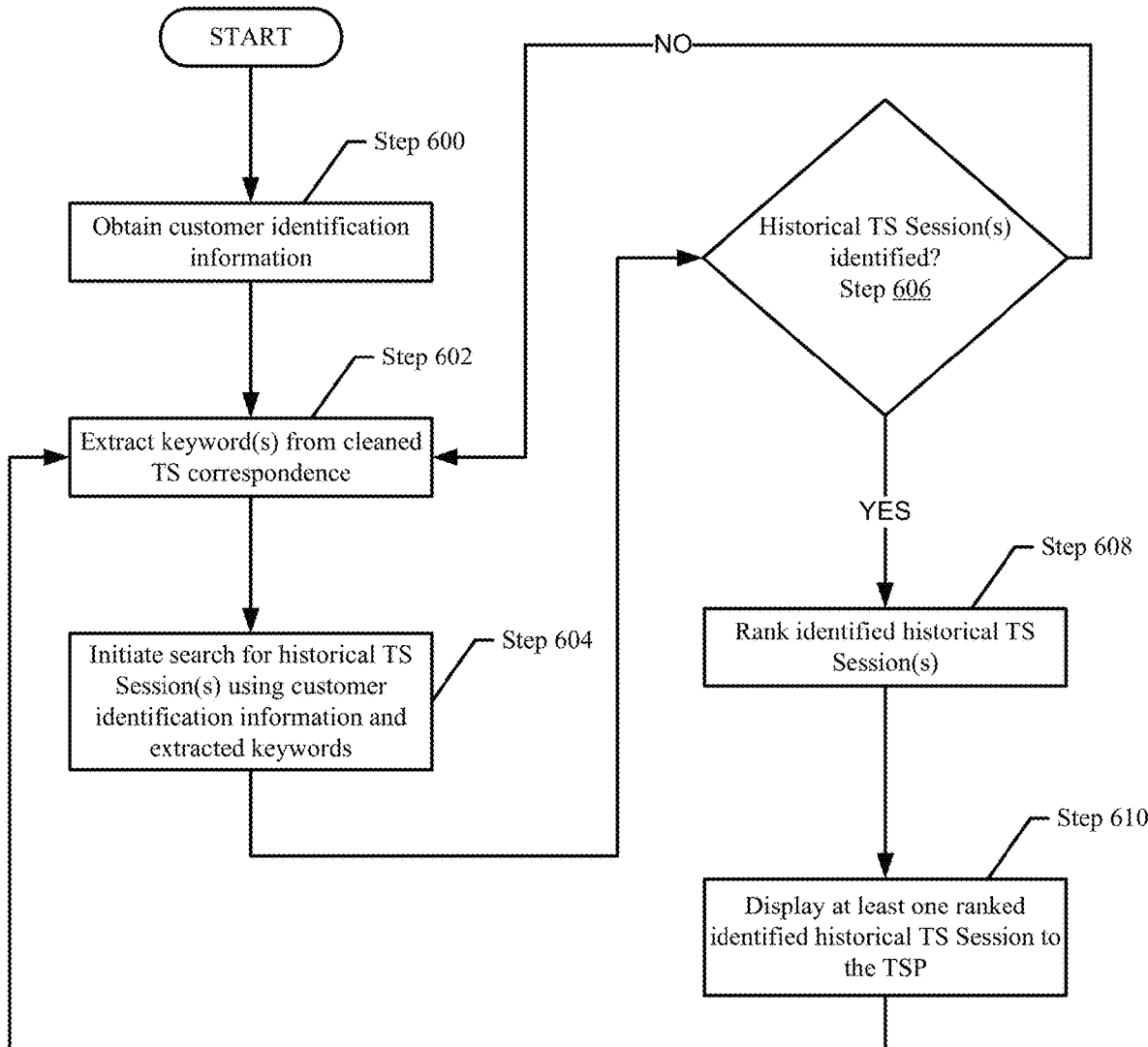
FIGS. 6-7 show methods to provide a TSP with relevant historical technical support sessions in accordance with one or more embodiments of the invention.

FIG. 6 shows methods to provide a TSP with relevant historical technical support sessions in accordance with one or more embodiments of the invention. More specifically, the method shown in FIG. 6 relates to scenarios in which the TSS is attempted to locate historical successful TS sessions for the customer where the same TSI was addressed. By identifying such historical TS sessions, the TSP may be able to efficiently address the same TSI for the customer. For example, if person 1 from customer A has a successful TS session to address a TSI, then when person 2 from the customer A initiates a TS session to address the same TSI, the method in FIG. 6 may be used to identify the prior successful TS session to aid the TSP in efficiently resolving the same TSI for person 2.

The method shown in FIG. 6 may be performed by, for example, a technical support system (e.g., 200, FIG. 2.1). Other components of the system in FIG. 1.1-2.2 may perform all, or a portion, of the method of FIG. 6 without departing from the invention.

While FIG. 6 is illustrated as a series of steps, any of the steps may be omitted, performed in a different order, additional steps may be included, and/or any or all of the steps may be performed in a parallel and/or partially overlapping manner without departing from the invention.

The method shown in FIG. 6 may occur in parallel to the method shown in FIG. 3.1. More specifically, as the TSP and the customer are interacting per-steps 300-312, the method shown in FIG. 6 may be performed to identify in real time or near-real time prior TS sessions (also referred to as historical TS sessions) that were performed for this customer (e.g., a legal entity or a specific person associated with a legal entity) and that addressed the same TSI.

In step 600, the customer information is obtained. The customer information made be obtained from the TSP and/or from the customer. The customer information includes information to identify the customer.

In step 602, one or more keywords are extracted from the TS correspondence. The keywords may be determined by: (i) prompting the TSP to identify keywords, (ii) using a machine learning algorithm(s) to extract keywords from the TS session, (iii) using (ii) to identify a set of keywords and then having the TSP confirm the keywords that were identified and/or remove keywords that were identified to obtain a verified set of keywords. The keyword extraction may be implemented using any combination of the above mechanisms and/or any other mechanisms without departing from the invention.

In step 604, a search of historical TS session is performed using the customer information and the keywords. The search may be performed using the index discussed above with respect to FIG. 4.

In step 606, a determination is made about whether any historical TS sessions were identified. If one or more historical TS sessions were identified, the process proceeds to step 608; otherwise, the process proceeds to step 602 to obtain additional keywords (e.g., additional keywords that appear in the TS correspondence that has occurred since step 602 was last performed). In this manner, the FIG. 6 is continuously performed to attempt to identify relevant historical TS sessions.

In step 608, the identified historical TS sessions are ranked. The ranking for each one of the identified historical TS sessions may be performed using the TS session metadata associated with each of the identified historical TS sessions. If the TS session metadata for a historical TS session only specifies that the historical TS session was successful or unsuccessful, then the rankings may group all successful historical TS sessions about the unsuccessful historical TS sessions. If the TS session metadata for a historical TS session specifies a value corresponding to how successful the historical TS session was, then the rankings may be based on the aforementioned values.

In step 610, at least a portion of the identified historical TS sessions are displayed to the TSP via the TSS. The display may include the listing of all (or a portion) of the identified historical TS sessions along with their rankings. Alternatively, only the successful historical TS sessions or the historical TS sessions with the corresponding values above a certain threshold (e.g., 8 out of 10, where 10 indicates a fully successful TS session).

The following is a non-limiting example of the method shown in FIG. 6. Turning to the example, consider a scenario in which a TSP and customer 1 participate in the following TS Session:

Customer 1: I am getting blue screen when I try to shutdown my laptop.
TSP 1: Thanks for reaching out to the tech support. How may I help you?
Customer 1: I am unable to shutdown my laptop and it is getting heated too much.
TSP 1: Hello user. I understand you are getting blue screen and laptop is getting heated.
TSP 1: Can you please check if all the drivers are up to date?
Customer 1: Where should I go and check that?
TSP 1: Is that okay, if you can give me the control and I will check if all the drivers are up to date.
Customer 1: Yes, sure.
TSP 1: Ok, I have got the control. I saw that the drivers are not up to date. I have installed the latest drivers, once those are installed, I hope this will resolve the issue.
Customer 1: Thanks for the quick resolve.
TSP 1: Is there anything else, I could help you with?
Customer 1: No, Thankyou.

Following the aforementioned TS session the following keyword that is identified is "bluescreen". The TS session is subsequently saved with the following metadata: (i) keyword: bluescreen and (ii) successfully resolved (i.e., a success tag).

Customer 2 subsequently initiates a TS session with TSP 2. When the TS session starts, the TSS performs the method shown in FIG. 6 in the background. The following is the initial TS correspondence of the second TS session:

Customer 2 Hi
TSP 2: Thanks for reaching out to the tech support. How may I help you?
Customer 2 While logging off, I am getting blue screen. How can I avoid that?

When the keyword "bluescreen" is detected, the storage is searched for a historical TS session that has the same keywords. In this example, the TS session with Customer 1 and TSP 1 is identified. In this example assume that customer 1 and customer 2 are two different individuals that work for the same company.

Once historical TS session is identified, it is displayed to TSP 2 via its TSS.

Figure 7:
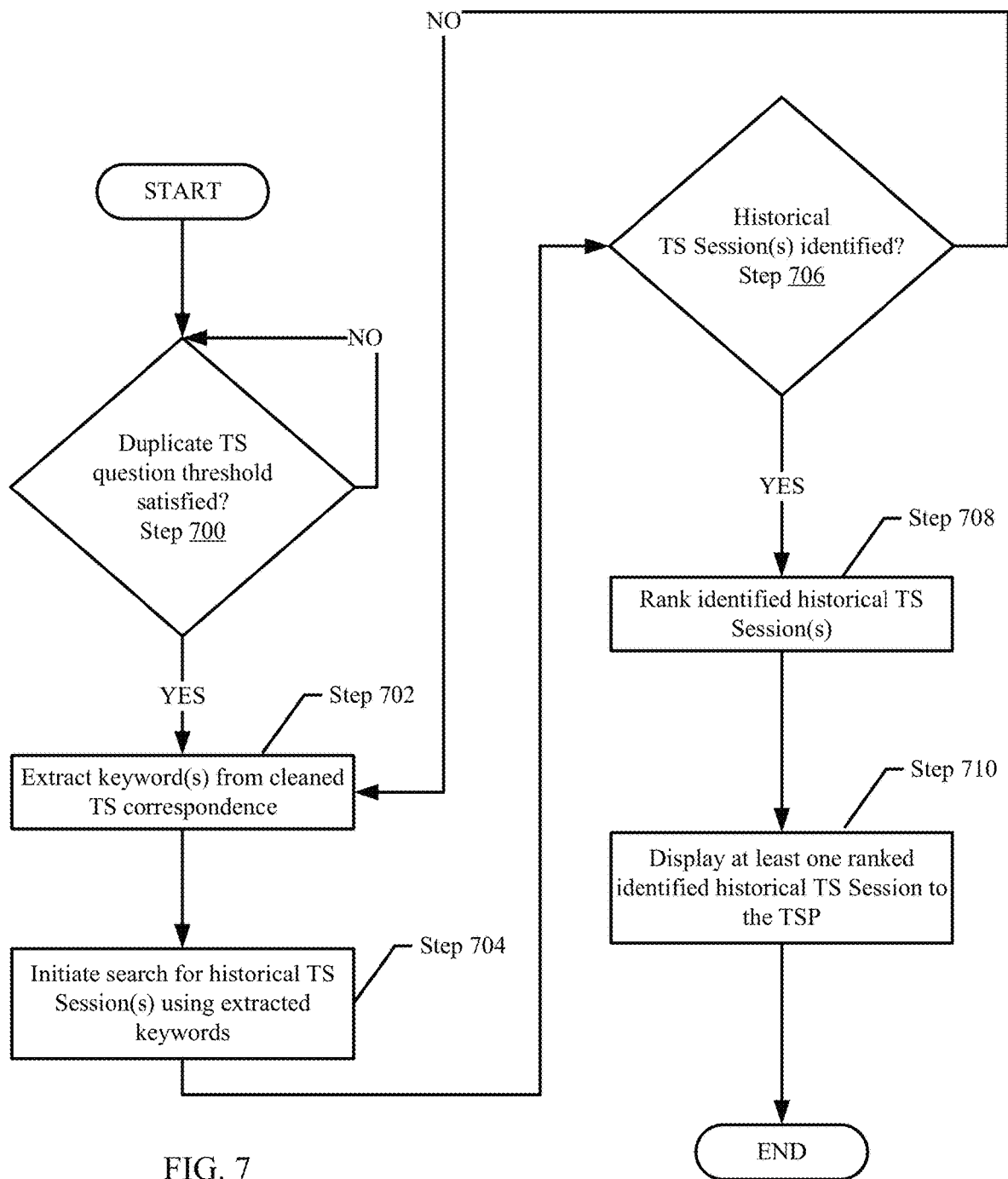

FIG. 7 shows methods to provide a TSP with relevant historical technical support sessions in accordance with one or more embodiments of the invention. The method shown in FIG. 7 may be performed in order to trigger the search for historical TS sessions that may be used by the TSP to successfully resolve the current TS session. The method shown in FIG. 7 may be performed by, for example, a technical support system (e.g., 200, FIG. 2.1). Other components of the system in FIGS. 1.1-2.2 may perform all, or a portion, of the method of FIG. 7 without departing from the invention.

While FIG. 7 is illustrated as a series of steps, any of the steps may be omitted, performed in a different order, additional steps may be included, and/or any or all of the steps may be performed in a parallel and/or partially overlapping manner without departing from the invention.

The method shown in FIG. 7 may occur in parallel to the method shown in FIG. 3.1. More specifically, as the TSP and the customer are interacting per-steps 300-306, the method shown in FIG. 7 may be performed to identify in real time or near-real time prior TS sessions (also referred to as historical TS sessions) that addressed the same TSI. In one embodiment of the invention, the trigger for FIG. 7 is when more than a threshold number of duplicate TS questions have been asked in the TS session. As discussed above, when duplicate TS questions are asked, it indicates that the TSP and customer have reached a point where they are not able to move successfully towards a resolution of the TSI. To that end, FIG. 7 identifies successful historical TS sessions that may be used to solve the TSI in the instant TS session.

In step 700, a determination is made about whether the duplicate TS question threshold is satisfied. The duplicate TS question threshold corresponds to the number of duplicate questions asked prior to performing the remainder of FIG. 7. The duplicate TS question threshold may be a default value (e.g., 2), may be set per customer, per TSP, and/or using any other level of granularity. The duplicate TS questions in a given TS session is tracked by the TSS as it performs FIG. 3.1. Further, once the duplicate TS question threshold is satisfied, the duplicate TS question counter may be reset). This enables the method shown in FIG. 7 to be triggered multiple times during a single TS session. If duplicate TS question threshold is satisfied the process proceeds to step 702; otherwise the TSS continue to wait until the duplicate TS question threshold is satisfied.

In step 702, one or more keywords are extracted from the TS correspondence. The keywords may be determined by: (i) prompting the TSP to identify keywords, (ii) using a machine learning algorithm(s) to extract keywords from the TS session, (iii) using (ii) to identify a set of keywords and then having the TSP confirm the keywords that were identified and/or remove keywords that were identified to obtain a verified set of keywords. The keyword extraction may be implemented using any combination of the above mechanisms and/or any other mechanisms without departing from the invention.

In step 704, a search for historical TS session is performed using the keywords. The search may be performed using the index discussed above with respect to FIG. 4.

In step 706, a determination is made about whether any historical TS sessions were identified. If one or more historical TS sessions were identified, the process proceeds to step 708; otherwise, the process may optionally proceed to step 702 to obtain additional keywords (e.g., additional keywords that appear in the TS correspondence that has occurred since step 702 was last performed). In this manner, the FIG. 7 is continuously performed to attempt to identify relevant historical TS sessions.

In step 708, the identified historical TS sessions are ranked. The ranking for each one of the identified historical TS sessions may be performed using the TS session metadata associated with each of the identified historical TS sessions. If the TS session metadata for a historical TS session only specifies that the historical TS session was successful or unsuccessful, then the rankings may group all successful historical TS sessions about the unsuccessful historical TS sessions. If the TS session metadata for a historical TS session specifies a value corresponding to how successful the historical TS session was, then the rankings may be based on the aforementioned values.

In step 710, at least a portion of the identified historical TS sessions are displayed to the TSP via the TSS. The display may include the listing of all (or a portion) of the identified historical TS sessions along with their rankings. Alternatively, only the successful historical TS sessions or the historical TS sessions with the corresponding values above a certain threshold (e.g., 8 out of 10, where 10 indicates a fully successful TS session).

The method shown in FIG. 7 may be performed continuously during the course of a given TS session (e.g., whenever the duplicate TS question threshold is satisfied).

FIG. 8.1 shows a method to process questions (also referred to as TS questions) in completed technical support sessions in accordance with one or more embodiments of the invention. The method shown in FIG. 8.1 may be performed by, for example, a technical support system (e.g., 200, FIG. 2.1). Other components of the system in FIGS. 1.1-2.2 may perform all, or a portion, of the method of FIG. 8.1 without departing from the invention.

While FIG. 8.1 is illustrated as a series of steps, any of the steps may be omitted, performed in a different order, additional steps may be included, and/or any or all of the steps may be performed in a parallel and/or partially overlapping manner without departing from the invention.

In Step 800, a technical support issue (TSI) is selected.

In Step 802, the TSI is used to identify one or more historical TS sessions. In one of the inventions, the TSI in combination with the index (see e.g., FIG. 4 above) may be used to identify one or more historical TS sessions.

In Step 804, one or more questions are identified in from the identified historical TS sessions. The questions may be identified using the NLP (see e.g., FIG. 3.1, Step 306) and/or by one or more TSPs.

In Step 806, the TSS then issues one or more ranking requests to one or more TSPs. The ranking requests may be sent to any TSPs, which may or may not be in the same TSR. Further, depending on the TSI, the ranking requests may only be sent to TSPs that were previously identified as subject matter experts for the TSI. The ranking requests may include all questions identified in step 804 such that the TSP is required to provide a ranking for all questions or the ranking request only includes one or a subset of questions for the TSP to rank. In addition to receiving the questions, the ranking requests may include all or a portion of the historical TS sessions from which the questions were extracted. The inclusion of the inclusion of all or a portion of the historical TS sessions may provide additional context for the TSPs to take into account when ranking the questions.

In Step 808, one or more ranking responses are received from the TSPs. The ranking responses specify a ranking (which may be relative or absolute) of the questions. For example, the questions may be ranked from best (i.e., most effective in ultimately resolving the TSI) to worst (i.e., not useful in resolving the TSI). In another example, each question may be individually ranked on a scale of 1 to 10, with 1 indicating that the question was not useful in resolving the TSI, and 10 indicating that the question was very effective in ultimately resolving the TSI.

In Step 810, the ranking responses are aggregated on a per-question basis and used to generate a pre-question quality score.

In Step 812, the questions along with the TSI and the quality score are stored in the storage.

The method shown in FIG. 8.1 may be performed periodically on questions for each of the TSIs. Further, questions that were previously ranked may be reevaluated using the method shown in FIG. 8.1. The reevaluation allows for the ranking of questions to change over time to more accurately reflect how effective the particular question is in resolving the TSI. In scenarios where a question is reevaluated, the quality score generated during the reevaluation (may or may not) take into account prior received ranking responses for the question.

FIG. 8.2 shows a method to perform question pre-checking in accordance with one or more embodiments of the invention. The method shown in FIG. 8.2 may be performed by, for example, a technical support system (e.g., 200, FIG. 2.1). Other components of the system in FIGS. 1.1-2.2 may perform all, or a portion, of the method of FIG. 8.2 without departing from the invention.

While FIG. 8.2 is illustrated as a series of steps, any of the steps may be omitted, performed in a different order, additional steps may be included, and/or any or all of the steps may be performed in a parallel and/or partially overlapping manner without departing from the invention.

In step 820, a TS question (also referred to as a question) is received from the TSP. The TS question may be entered via GUI on the TSS.

In step 822, the TS question is cleaned to obtain a clean TS question. (see e.g., FIG. 3.1, 302)

In step 824, a determination is made about whether the cleaned TS question is a duplicative of a TS question(s) that was stored in FIG. 8.1, Step 812. The determination of whether the cleaned TS question is duplicative of a TS question is performed in substantially the same manner as FIG. 3.1, Step 310. If the cleaned TS question is a duplicate of the TS question, the process proceeds to step 826; otherwise, the process ends. In this context, the end of the process indicates that the pre-check module was unable to identify any question in storage that was duplicative of the TS question and, as such, is unable to provide any insight into whether the TS question will (or will not) be effective in helping the TSP resolve the TSI that is the subject of the TS session that it is currently conducted with the customer.

In step 826, the quality score for each TS question identified in Step 824 is obtained.

In step 828, the quality score of the TS question and, optionally, the duplicative question (i.e., the TS question identified in Step 826), is displayed on the GUI of the TSS. If there are multiple TS questions identified in step 826, then the quality score displayed in step 828 may be an average of the quality scores of the TS questions identified in step 826. Alternatively, if there are multiple TS questions identified in step 826, then the GUI may display all the duplicative questions (i.e., the TS questions identified in Step 826) along with their quality scores.

The following is a non-limiting example of quality ranking of questions in accordance with FIGS. 8.1-8.2. Turning to the example, consider the TS correspondences shown in FIG. 3.2. The TS correspondence at T2 is ranked as not helpful as the customer had already indicated what their problem was at T1. The TS correspondence at T5 is ranked as a strong question (i.e., useful at ultimately resolving the TSI). The TS correspondence at T7 is ranked as moderate and that it will not be able to ultimately resolve the TSI. The TS correspondence (which can be interpreted as a question) at T11 is ranked as a strong question (i.e., useful at ultimately resolving the TSI). The TS correspondence at T15 is ranked as a strong question.

By ranking the aforementioned TS questions in the historical TS session shown in FIG. 3.2, subsequent TSPs may enter proposed questions into the pre-check module to see whether such questions would be helpful in resolving the same TSI as the TSI that was the subject of the historical TS session in FIG. 3.2.

FIG. 9.1 shows a method to generate a question path graph in accordance with one or more embodiments of the invention. The method shown in FIG. 9.1 may be performed by, for example, a technical support system (e.g., 200, FIG. 2.1). Other components of the system in FIGS. 1.1-2.2 may perform all, or a portion, of the method of FIG. 9.1 without departing from the invention.

While FIG. 9.1 is illustrated as a series of steps, any of the steps may be omitted, performed in a different order, additional steps may be included, and/or any or all of the steps may be performed in a parallel and/or partially overlapping manner without departing from the invention.

In step 900, a technical support issue (TSI) is selected.

In Step 902, the TSI is used to identify one or more historical TS sessions. In one of the invention, the TSI in combination with the index (see e.g., FIG. 4 above) may be used to identify one or more historical TS sessions.

In Step 904, one or more questions are identified from the identified historical TS sessions. The questions may be identified using the NLP (see e.g., FIG. 3.1, Step 306) and/or by one or more TSPs. The identified questions, which are ordered by time stamp, are referred to as a question sequence. The result of step 904 is a set of identified question sequences.

In step 906, a question path graph (QPG) is generated using the question path sequences. The QPG is a directed graph, where each node in the QPG is a question and each edge in the QPG links each node with at least one other node. Any two given nodes in the QPG are only connected when they are sequential questions in the question sequences. In one embodiment of the invention, prior to generating the QPG, the questions in the individual question sequences are analyzed (e.g., using the duplicative question analysis described above, see e.g., FIG. 3.1) and all questions that are duplicative of each other are represented by a single node in the QPG. In this manner, different versions of the same question are only represented once in the QPG. However, the node in QPG may specify all versions of the duplicative question.

In addition to storing the QPG, each node may be associated with likelihood of success information. The likelihood of success information is derived from the question sequences that are used to generate the QPG. Each question sequence may be deemed successful or unsuccessful. A given question sequence may be deemed successful or unsuccessful based on whether the historical TS session from which it was extracted was deemed successful or unsuccessful (See e.g., FIG. 4). If likelihood of success information associated with a given node may include multiple entries, where each entry specifies an upstream node and a downstream node and how many potential paths from the node that include the specified upstream node and downstream node may result in an ultimately successful resolution of the TSI. The upstream node is connected to the node via a directed edge that starts at the upstream node and ends at the node. The down node is connected to the node via a directed edge that starts at the node and ends at the downstream node.

For example, if a portion of a QPG is as follows: Q1--->Q2-->Q3, then Q1 is the upstream node of Q2 and Q3 is the downstream node of Q2. The likelihood of success information for Q2 may include an entry <Q1, Q3>=2, which indicates if the TSP asked Q1 and then asks Q2 followed by Q3 there are two potential question paths within the QPG that are likely to result in successful resolution of the TSI. An additional example is provided in FIG. 9.3 below.

Continuing with the discussion of FIG. 9.2, in step 908, the QPG along with QPG metadata (which include the same or substantially the same information as TS session metadata) and, optionally, likelihood of success information is provided and stored in the storage.

FIG. 9.2 shows a method for using a question path graph in a technical support session in accordance with one or more embodiments of the invention. The method shown in FIG. 9.2 may be performed by, for example, a technical support system (e.g., 200, FIG. 2.1). Other components of the system in FIG. 1.1-2.2 may perform all, or a portion, of the method of FIG. 9.2 without departing from the invention.

While FIG. 9.2 is illustrated as a series of steps, any of the steps may be omitted, performed in a different order, additional steps may be included, and/or any or all of the steps may be performed in a parallel and/or partially overlapping manner without departing from the invention.

In step 920, the TSI for the TS session is determined. The TSI may be determined by the TSP conducting the TS session, by a machine learning algorithm that is evaluating the TS session in real time or near real-time, or using any other mechanism to determine the TSI.

In step 922, the storage is searched using the TSI to identify a QPG.

In step 924, a determination is made about whether a QPG is present. If a QPG is not identified the process ends. In this context, the process ends as there is no QPG that is relevant for the TSI. If a QPG is present, the method proceeds to step 926.

In step 926, a sub-portion portion of the QPG is identified using the TS correspondence. Specifically, a question(s) is identified from the TS correspondence (e.g., using the same or substantially the same methods described in FIG. 3.1) and matched with a node in the QPG. The question is deemed to match a node in the QPG if the question is duplicative of the node (i.e., the question represented by the node). The determination of whether the question is duplicative of the node in the QPG may be performed using the same or substantially the same methods described in FIG. 3.1. Once the node is identified, the node and all nodes downstream from the node are identified. A node is considered downstream of another node if it is directly or indirectly downstream of the node. See e.g., FIG. 9.3.

In step 928, the sub-portion portion of the QPG and, optionally, the likelihood of success information is displayed to the TSP via the GUI on the TSS. While step 926 and 928 relate to only displaying a sub-portion of the QPG, the entire QPG (optionally including the likelihood of success information) is displayed. In one embodiment of the invention, an edge connecting a node to a second node may visually indicate whether asking the first question followed by the second question has historically resulted in successful resolution of a TS session. The visual indication may be a represented using different color lines (which denote the edges) and/or different types of lines (e.g., solid versus dashed). The invention is not limited to the aforementioned visual indications.

FIG. 9.3 shows an example of a question path graph in accordance with one or more embodiments of the invention. The example is not intended to limit the scope of the invention.

Turning to the example, consider a scenario in which the following question sequences are identified for a TSI.

| Question Sequences | | |
|---|---|---|
| Question Sequence No. (QSN) | Question Sequence | Successful |
| 1 | Q1, Q2, Q4 | NO |
| 2 | Q1, Q2, Q3, Q5 | YES |
| 3 | Q1, Q2, Q3, Q9 | YES |
| 4 | Q10, Q2, Q4 | YES |
| 5 | Q10, Q2, Q3, Q9 | NO |
| 6 | Q10, Q2, Q3, Q5 | YES |
| 7 | Q1, Q2, Q7, Q8, Q3, Q5 | YES |
| 8 | Q10, Q2, Q3, Q9, Q11 | YES |

Based on the above, the QPG shown in FIG. 9.3 is generated. Further, based on the above question sequences, the likelihood of success information for Q1 is:

| | |
|---|---|
| Q2 | 3/4 |

The likelihood of success information indicates that if the TSP asks Q1 and then Q2, then are four paths (QSN 1, 2, 3, and 7) that include Q1-->Q2 and three of these paths (i.e., QSN 1, 2, 3, and 7) will likely lead to a successful resolution of the TSI.

Further, based on the above question sequences, the likelihood of success information for Q2 is:

| | |
|---|---|
| Q1, Q4 | 0 |
| Q10, Q4 | 1 |
| Q10, Q3 | 1/2 |
| Q1, Q3 | 1 |
| Q1, Q7 | 1 |

The likelihood of success information indicates that: (i) if the TSP asked Q1-->Q2-->Q4 then there is no question path that will result in a successful resolution of the TSI; (ii) if the TSP asked Q10-->Q2-->Q4 then there is one question path that will result in a successful resolution of the TSI; (iii) if the TSP asked Q10-->Q2-->Q3 then there is one question path (out of two possible question paths) that will result in a successful resolution of the TSI; (iv) if the TSP asked Q1-->Q2-->Q3 then there is one question path that will result in a successful resolution of the TSI; and (v) if the TSP asked Q1-->Q2-->Q7 then there is one question path that will result in a successful resolution of the TSI.

Continuing with the example, if the TS correspondence in a given TS session specified Q1, then the QPG shown in FIG. 9.3 may be identified and the QPG (excluding Q10) may be shown to the TSP. The TSP may then use the displayed portion of the QPG to determine which sequence of questions to ask to attempt to resolve the TSI that is the subject of the TS session.

As discussed above, embodiments of the invention may be implemented using computing devices. FIG. 10 shows a diagram of a computing device in accordance with one or more embodiments of the invention. The computing device (1000) may include one or more computer processors (1002), non-persistent storage (1004) (e.g., volatile memory, such as random access memory (RAM), cache memory), persistent storage (1006) (e.g., a hard disk, an optical drive such as a compact disk (CD) drive, or digital versatile disk (DVD) drive, a flash memory, etc.), a communication interface (1012) (e.g., Bluetooth interface, infrared interface, network interface, optical interface, etc.), input devices (1010), output devices (1008), and numerous other elements (not shown) and functionalities. Each of these components is described below.

In one embodiment of the invention, the computer processor(s) (1002) may be an integrated circuit for processing instructions. For example, the computer processor(s) may be one or more cores, or micro-cores, of a processor. The computing device (1000) may also include one or more input devices (1010), such as a touchscreen, keyboard, mouse, microphone, touchpad, electronic pen, or any other type of input device. Further, the communication interface (1012) may include an integrated circuit for connecting the computing device (1000) to a network (not shown) (e.g., a local area network (LAN), a wide area network (WAN) such as the Internet, mobile network, or any other type of network) and/or to another device, such as another computing device.

In one embodiment of the invention, the computing device (1000) may include one or more output devices (1008), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1002), non-persistent storage (1004), and persistent storage (1006). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention. Accordingly, the scope of the invention should be limited only by the attached claims.

What is claimed is:

1. A method for managing a technical support session, comprising:
obtaining a technical support question from a first technical support person (TSP) that is conducting the technical support session;
converting the technical support question into a clean text format to generate a converted technical support question, wherein converting comprises:
identifying and correcting at least one of grammatical or punctuation mistakes;
storing the converted technical support question in a storage of a technical support system;
determining, after the storing and using machine learning, that the converted technical support question is a duplicate of a plurality of prior converted technical support questions;
in response to the determination, obtaining a plurality of quality scores, wherein each of the plurality of quality scores is associated with a corresponding one of the plurality of prior converted technical support questions;
displaying the plurality of quality scores and the plurality of prior converted technical support questions to the first TSP in a user interface on a technical support system that the first TSP is using to conduct the technical support session;
after the technical support session ends,
sending a ranking request to the first TSP, wherein the ranking request specifies a chosen one of the prior converted technical support questions;
obtaining, in response to the ranking request, a ranking response from the first TSP; and
updating a quality score of the plurality of quality scores associated with the chosen one of the prior converted technical support questions based on the ranking response.

2. The method of claim 1, wherein the ranking response increases or decreases the quality score.

3. The method of claim 1, wherein the converted technical support question is identical to at least one of the plurality of prior converted technical support questions.

4. The method of claim 1, wherein at least one of the plurality of prior converted technical support questions is present in a historical technical support session.

5. The method of claim 4, wherein the historical technical support session is tagged as successful.

6. The method of claim 5, wherein at least one of the plurality of prior converted technical support questions is ranked by a second TSP, wherein the second TSP conducted the historical technical support session.

7. The method of claim 5, wherein at least one of the plurality of prior converted technical support questions is ranked by a second TSP, wherein the second TSP did not conduct the historical technical support session.

8. A non-transitory computer readable medium comprising computer readable program code to:
obtain a technical support question from a first technical support person (TSP) that is conducting a technical support session;
convert the technical support question into a clean text format to generate a converted technical support question wherein converting comprises:
identifying and correcting at least one of grammatical or punctuation mistakes;
store the converted technical support question in a storage of a technical support system;
determine, after the storing and using machine learning, that the converted technical support question is a duplicate of a plurality of prior converted technical support questions;

in response to the determination, obtain a plurality of quality scores, wherein each of the plurality of quality scores is associated with a corresponding one of the plurality of prior converted technical support questions;

display the plurality of quality scores and the plurality of prior converted technical support questions to the first TSP in a user interface on a technical support system that the first TSP is using to conduct the technical support session;

after the technical support session ends,
send a ranking request to the first TSP, wherein the ranking request specifies a chosen one of the prior converted technical support questions;
obtain, in response to the ranking request, a ranking response from the first TSP; and
update a quality score of the plurality of quality scores associated with the chosen one of the prior converted technical support questions based on the ranking response.

9. The non-transitory computer readable medium of claim 8, wherein the ranking response increases or decreases the quality score.

10. The non-transitory computer readable medium of claim 8, wherein the converted technical support question is not identical to at least one of the plurality of prior converted technical support questions.

11. The non-transitory computer readable medium of claim 8, wherein at least one of the plurality of prior converted technical support questions is present in a historical technical support session.

12. The non-transitory computer readable medium of claim 11, wherein the historical technical support session is tagged as unsuccessful.

13. The non-transitory computer readable medium of claim 12, wherein at least one of the plurality of prior converted technical support questions is ranked by a second TSP, wherein the second TSP conducted the historical technical support session.

14. The non-transitory computer readable medium of claim 12, wherein at least one of the plurality of prior converted technical support questions is ranked by a second TSP, wherein the second TSP did not conduct the historical technical support session.

15. A technical support (TS) system, comprising:
a processor;
memory; and
a user interface;
wherein the TS system is configured to:
obtain a technical support question from a first technical support person (TSP) that is conducting a technical support session;
convert the technical support question into a clean text format to generate a converted technical support question, wherein converting comprises:
identifying and correcting at least one of grammatical or punctuation mistakes;
store the converted technical support question in a storage of a technical support system;
determine, using machine learning, that the converted technical support question is a duplicate of a plurality of prior converted technical support questions;
in response to the determination, obtain a plurality of quality scores, wherein each of the plurality of quality scores is associated with a corresponding one of the plurality of prior converted technical support questions; and
display the plurality of quality scores and the plurality of prior converted technical support questions to the first TSP in a user interface on a technical support system that the first TSP is using to conduct the technical support session;
after the technical support session ends,
send a ranking request to the first TSP, wherein the ranking request specifies a chosen one of the prior converted technical support questions;
obtain, in response to the ranking request, a ranking response from the first TSP; and
update a quality score of the plurality of quality scores associated with the chosen one of the prior converted technical support questions based on the ranking response.

16. The TS system of claim 15, wherein the converted technical support question is identical to at least one of the plurality of prior converted technical support questions.

17. The TS system of claim 15, wherein at least one of the plurality of prior converted technical support questions is present in a historical technical support session, and wherein at least one of the plurality of prior converted technical support questions is ranked by a second TSP, wherein the second TSP did not conduct the historical technical support session.

* * * * *